United States Patent
Southward et al.

(10) Patent No.: US 8,529,853 B2
(45) Date of Patent: Sep. 10, 2013

(54) ZROX, CE-ZROX, CE-ZR-REOX AS HOST MATRICES FOR REDOX ACTIVE CATIONS FOR LOW TEMPERATURE, HYDROTHERMALLY DURABLE AND POISON RESISTANT SCR CATALYSTS

(75) Inventors: Barry W. L. Southward, Catoosa, OK (US); John G. Nunan, Tulsa, OK (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/519,404

(22) PCT Filed: Mar. 19, 2011

(86) PCT No.: PCT/EP2011/001354
§ 371 (c)(1),
(2), (4) Date: Jul. 12, 2012

(87) PCT Pub. No.: WO2011/116907
PCT Pub. Date: Sep. 29, 2011

(65) Prior Publication Data
US 2012/0294792 A1    Nov. 22, 2012

Related U.S. Application Data

(63) Continuation-in-part of application No. 12/732,819, filed on Mar. 26, 2010, now Pat. No. 8,017,097.

(51) Int. Cl.
*B01D 53/56* (2006.01)
*B01D 53/94* (2006.01)

(52) U.S. Cl.
USPC ................... 423/213.2; 423/239.1; 423/239.2

(58) Field of Classification Search
USPC ............................................ 423/213.2, 239.2
See application file for complete search history.

(56) References Cited

U.S. PATENT DOCUMENTS

| | | |
|---|---|---|
| 552,128 A | 12/1895 | Hudson et al. |
| 4,085,193 A | 4/1978 | Nakajima et al. |
| 4,916,107 A | 4/1990 | Brand et al. |
| 4,929,586 A | 5/1990 | Hegedus et al. |
| 4,961,917 A | 10/1990 | Byrne |
| 5,328,672 A * | 7/1994 | Montreuil et al. ............ 423/212 |
| 5,589,147 A | 12/1996 | Farnos et al. |
| 5,693,299 A | 12/1997 | Chopin |
| 5,712,218 A | 1/1998 | Chopin |
| 5,827,489 A | 10/1998 | Garcin et al. |
| 6,040,265 A | 3/2000 | Nunan |
| 6,255,242 B1 | 7/2001 | Umemoto |
| 6,387,338 B1 | 5/2002 | Anatoly et al. |
| 6,468,941 B1 | 10/2002 | Bortun |
| 6,506,705 B2 | 1/2003 | Blanchard |
| 6,569,394 B2 | 5/2003 | Fischer et al. |
| 6,585,944 B1 | 7/2003 | Nunan |
| 6,605,264 B2 | 8/2003 | Bortun et al. |
| 6,843,971 B2 | 1/2005 | Schafer-Sindlinger et al. |
| 7,005,116 B2 | 2/2006 | Schafer-Sindlinger et al. |
| 7,118,722 B2 | 10/2006 | Tran et al. |
| 7,182,927 B2 | 2/2007 | Tran et al. |
| 7,202,194 B2 | 4/2007 | Muhammed |
| 7,431,895 B2 | 10/2008 | Pfeifer et al. |
| 7,498,010 B2 | 3/2009 | Andreasson et al. |
| 7,943,104 B2 | 5/2011 | Kozlov |
| 7,964,527 B2 | 6/2011 | Larcher |
| 2005/0069477 A1 | 3/2005 | Hong et al. |
| 2006/0210462 A1 | 9/2006 | Larcher |
| 2008/0095682 A1 | 4/2008 | Kharas et al. |
| 2009/0246109 A1 | 10/2009 | Southward |
| 2010/0040523 A1 | 2/2010 | Larcher |
| 2011/0236282 A1* | 9/2011 | Southward et al. ........ 423/239.1 |

FOREIGN PATENT DOCUMENTS

| | | |
|---|---|---|
| EP | 1 736 232 A1 | 12/2006 |
| GB | 1 473 883 A | 5/1977 |
| JP | 5-169476 A | 7/1993 |
| JP | 5-242464 A | 9/1993 |
| WO | 03/053852 A1 | 7/2003 |
| WO | 03/082740 A1 | 10/2003 |
| WO | 03/082741 A1 | 10/2003 |
| WO | 2008/046920 A1 | 4/2008 |
| WO | 2008/051752 A2 | 5/2008 |
| WO | 2008/085265 A1 | 7/2008 |
| WO | 2008/106519 A1 | 9/2008 |
| WO | 2008/118434 A1 | 10/2008 |
| WO | 2008/150462 A2 | 12/2008 |
| WO | 2009/001131 A1 | 12/2008 |
| WO | 2009/118188 A1 | 10/2009 |
| WO | 2010/002486 A2 | 1/2010 |

OTHER PUBLICATIONS

International Search Report and Written Opinion received in PCT/EP2011/001354 from the International Searching Authority, mailed Feb. 2, 2012.
J. P. Breen, et al., "An investigation of the thermal stability and sulphur tolerance of Ag/y-Al2O3 catalysts for the SCR of NOx with hydrocarbons and hydrogen", Applied Catalysis B: Environmental, vol. 70, (2007), pp. 36-44.
R.M. Heck, R.J. Farrauto, "Automobile exhaust catalysts", Applied Catalysis A: General, vol. 221, (2001), pp. 443-457.
Douglas Ball, et al., "FlexMetal Catalyst Technologies", SAE Technical Paper Series, (2005), 2005-01-1111.
A. Fritz, V. Pitchon, "The current state of research on automotive lean NOx catalysis", Applied Catalysis B: vol. 13, (1997), pp. 1-25.
V. A. Kondratenko, et al., "Mechanistic aspects of N2O and N2 formation in NO reduction by NH3 over Ag/Al2O3: The effect of O2 and H2", Applied Catalysis B: Environmental, vol. 84, (2008), pp. 497-504.
Hanna Sjoevall, et al., "Detailed Kinetic Modeling of NH3 and H2O Adsorption, and NH3 Oxidation over Cu-ZSM-5", J. Phys.Chem C, (2009), vol. 113, pp. 1393-1405.
Stephan Bremm, et al., "Bluetec Emission Control System for the US Tier 2 Bin 5 Legislation", SAE Technical Paper Series, (2008), 2008-01-1184.

(Continued)

*Primary Examiner* — Timothy Vanoy
(74) *Attorney, Agent, or Firm* — Smith, Gambrell & Russell, LLP

(57) ABSTRACT

The present invention relates to application of catalysts for the Selective Catalytic Reduction of oxides of Nitrogen using N-containing reductant. The catalysts are characterized as phase pure lattice oxide materials into which catalytically active cations are incorporated at high levels of dispersion such that conventional analysis reveals a highly phase pure material. The materials are further characterized by high activity, hydrothermal durability and poison tolerance in the intended application.

15 Claims, 7 Drawing Sheets

(56) References Cited

OTHER PUBLICATIONS

A. Schuler, et al., "Dynamic Model for the Selective Catalytic Reduction of NO with NH3 on Fe-Zeolite Catalysts", SAE Technical Paper Series, (2008), 2008-01-1323.

Yisun Cheng, et al., "NMR studies of Cu/zeolite SCR catalysts hydrothermally aged with urea", Catalysis Today, vol. 36, (2008), pp. 34-39.

James Girard, et al., "Influence of Hydrocarbon Storage on the Durability of SCR Catalysts", SAE Technical Paper Series, (2008), 2008-01-0767.

S. Verdier, et al., "Doped Zirconia with Acidity and High Thermal Stability, for Durable Diesel Catalysts", SAE Trchinal Paper Series, (2007), 2007-01-0238.

N. Apostolescu, et al., "Selective catalytic reduction of nitrogen oxides by ammonia on iron oxide catalysts", Applied Catalysis B: Environmental, vol. 62, (2006), pp. 104-114.

J. Zeldovich, "The Oxidation of Nitrogen in Combustion and Explosions", Acta Physicochimica U.R.S.S., vol. 21, No. 4, 1946, pp. 577-628.

Egbert S. J. Lox, "Automotive Exhaust Treatment", Handbook of Heterogeneous Catalysis 2nd Edition, 2008, pp. 2274-2345.

Yinyan Huang et al., "Deactivation of Cu/Zeolite SCR Catalyst Due to Reductive Hydrothermal Aging", SAE Int. J. Fuels of Lubricants, vol. 1, issue 1, 2008, pp. 466-470.

Grossale, A. et al. (2008) "The Chemistry of the NO/NO2—NH3 'Fast' SCR Reaction Over Fe-ZsM5 Investigated by Transient Reaction Analysis" Journal of Catalysis, 256: 312-3222.

* cited by examiner

ZROX, CE-ZROX, CE-ZR-REOX AS HOST MATRICES FOR REDOX ACTIVE CATIONS FOR LOW TEMPERATURE, HYDROTHERMALLY DURABLE AND POISON RESISTANT SCR CATALYSTS

This application is a 371 National Phase entry of PCT/EP2011/001354, filed 19 Mar. 2011, and claims the benefit is a continuation-in-part of U.S. patent application Ser. No. 12/732,819, filed 26 Mar. 2010, now U.S. Pat. No. 8,017,097, both of which are herein incorporated by reference in their entirety.

Oxides of Nitrogen, specifically NO and $NO_2$ collectively referred to as NOx, are well known and toxic by-products of internal combustion engines e.g. motor vehicles, fossil fuel powered electricity generation systems and industrial processes. NOx, and more specifically NO, is formed via the reactions of free radicals in the combustion process, as first identified by Y. B. Zeldovich (Acta Physico-chern. USSR, 21 (1946) 577), viz:

$$N_2 + O. \to NO + N. \tag{1}$$

$$N. + O_2 \to NO + O. \tag{2}$$

As indicated Nitrogen Oxides are directly toxic to living beings (P. E. Morrow J. Toxicol Environ Health 13(2-3), (1984), 205-27), in addition NOx directly contributes to and is an indirect factor in several sources of environmental pollution. Thus Nitrogen oxides are directly involved in the formation of acid rain but are also reagents in the processes for the production of photochemical smog and ozone which have been correlated to significant adverse impacts on human health (M. V. Twigg, Applied Catalysis B, vol. 70, (2007), 2). Hence increasingly stringent legislative limits have been introduced in order to regulate the emission of such compounds from the exhausts of both gasoline and diesel internal combustion engines e.g. Euro 5 or Euro 6 [Regulation (EC) No 715/2007 of the European Parliament and of the Council, 20 Jun. 2007, Official Journal of the European Union L 171/1, see also Twigg, Applied Catalysis B, vol. 70, (2007), p2-25 and R. M. Heck, R. J. Farrauto Applied Catalysis A vol. 221, (2001), p443-457 and references therein].

The challenge for meeting the legislative NOx targets for stoichiometric gasoline engines is readily fulfilled by the application of the well established chemistry of the three way catalytic converter (e.g. see SAE 2005-01-1111). However the converse is true for NOx reduction for diesel compression ignition engines or other fuel lean i.e. oxygen rich combustion cycles, e.g. lean gasoline direct injection, since three-way catalytic conversion is only effective under stoichiometric air:fuel ratios (SAE 2005-01-1111). Thus while diesel/compression ignition engines may offer increased durability, provide high torque at low engine rpm, and increased fuel economy/decreased emissions their inherent lean burn operation provides a major challenge to fulfilling legislative NOx targets. Hence a range of exhaust after-treatment technologies have been developed to address this requirement. These technologies include, but are not limited to, engine control methodologies/modification, alternate combustion cycles and the use of after-treatment systems e.g. catalytic control devices which eliminate exhaust pollutants by promoting chemical changes to convert the unwanted NOx species into nitrogen. Currently technologies for NOx control include the Diesel NOx Trap/NOx Storage Catalyst (DNT/NSC), Urea/$NH_3$ Selective Catalytic Reduction catalyst (SCR) and Hydrocarbon—SCR catalyst.

The chemistry of the Urea/Ammonia SCR catalyst comprises a complex set of decomposition (eqn 3—for Urea feed) and reduction—oxidation reactions (eqns 4-9) with diverse surface intermediates which form the basis for extensive academic and practical study e.g. App Cat B 13 (1997) 1-25, App Cat B 84 (2008) 497, J. Phys. Chem. C (2009), 113, 1393, SAE 2008-01-1184, SAE 2008-01-1323 etc. These reactions are summarised in eqns 3-9. Equations 4-6 detail the desired chemistries of the Selective Catalytic Reduction (SCR) catalyst i.e. the interaction between an oxidised form of Nitrogen (NO, $NO_2$) and a reduced form of Nitrogen ($NH_3$) with a subsequent condensative reaction to give $N_2$ and $H_2O$ as principle reaction products. However in certain instances additional and competing processes may be initiated which can result in loss of reductant concentration i.e. so-called parasitic oxidation (eqns 7-9) of the injected Urea/Ammonia resulting in the formation of $N_2$ and $H_2O$ (as a best case scenario—eqn 7), the generation of $N_2O$, powerful Greenhouse gas (approximately 300 stronger than $CO_2$ eqn 9), or even additional NOx (eqn 8).

| | | |
|---|---|---|
| (3) $(NH_2)CO + 4H_2O \to 2NH_3 + 6CO_2$ | Urea hydrolysis |
| (4) $4NO + 4NH_3 + O_2 \to 4N_2 + 6H_2O$ | standard/'slow' SCR |
| (5) $3NO_2 + 4NH_3 \to (7/2)N_2 + 6H_2O$ | $NO_2$ only SCR |
| (6) $NO + NO_2 + 2NH_3 \to 2N_2 + 3H_2O$ | 'Fast' SCR |
| (7) $4NH_3 + 3O_2 \to 2N_2 + 6H_2O$ | parasitic $NH_3$ oxidation to $N_2$ |
| (8) $4NH_3 + 5O_2 \to 4NO + 6H_2O$ | parasitic $NH_3$ oxidation to NO |
| (9) $2NH_3 + 2O_2 \to N_2O + 3H_2O$ | parasitic $NH_3$ oxidation to $N_2O$ |

The principal reaction mechanism is represented in equation (3). However, under practical conditions it has been repeatedly demonstrated that the reaction of NO/$NO_2$ mixtures with ca. 50% of the NOx present as $NO_2$ results in the highest rate of NOx conversion by $NH_3$ (eqn 4) (E. S. J. Lox Handbook of Heterogeneous Catalysis $2^{nd}$ Edition, p2274-2345 and references therein). Furthermore, while the reaction between $NH_3$ and $NO_2$ is known to occur (eqn 5), it is not kinetically dominant, hence as $NO_2$ concentration increases above ca. 50% there is a concomitant decrease in catalyst activity and overall rates (A. Grossale, I. Nova, E. Tronconi, D. Chatterjee, M. Weibel, J. Catal, 256 (2008) 312-322). However, it should always be stressed that the rates of reactions will also vary greatly depending on the reaction temperature in this especial instance on the sort of the catalyst used and indeed upon the presence of reactive poisons in the gas stream and the relative poison tolerance of the different catalyst formulations employed therein.

$NH_3$ SCR has been applied successfully for >20 years for the remediation of NOx from the exhaust gases of large industrial plants e.g. power stations. Hence there is extensive prior art in the field. The following discussion will attempt a brief précis of this body of work.

The first class of materials developed for the process is based upon vanadium oxide supported on titanium oxide. This class of catalyst may additionally be promoted by other metals such as Tungsten (or other acidic metals to enhance $NH_3$ activation/adsorption) or Alkali or Alkaline Earth metal (as a NOx trap). Such technologies were initially developed for power stations but have more recently been applied to mobile applications. Their long commercial history, relatively low cost and high performance in the preferred operational window of ca. 200-400° C. makes this class of technology attractive for some applications. There are however several drawbacks to such catalysts which are especially severe for vehicular applications. These drawbacks include limited hydrothermal durability, especially under the rigorous conditions of DPF (diesel particulate filter) regeneration, limited catalyst lifetime, susceptibility to poisoning by exhaust components e.g. SOx, and poor activity at low (<250° C., $NH_3$ activation and NO reduction is low) and higher temperatures (>ca. 400° C. parasitic oxidation of $NH_3$ being problematic). Exemplary references for Vanadia-Titania SCR include U.S. Pat. Nos. 4,085,193, 4,916,107, 4,929,586, 5,827,489, 6,475,944, 7,431,895, 7,498,010 and US2005/0069477 A1 amongst others.

The second class of materials for SCR catalysts is based upon Zeolites. Zeolites are microporous crystalline aluminosilicate materials characterised by well ordered 3-D structures with uniform pore/channel/cage structures of 3 to 10 Angstroms (depending on framework type) and the ability to undergo ion exchange to enable the dispersion of catalytically active cations throughout the structure. Zeolites, metal exchanged Zeolites and promoted versions thereof have been studied in great detail for many years and provide highly active low and intermediate temperature SCR catalysts e.g. Japanese Patent 51-69476 (1976). Given the aforementioned flexibility in structure type and modification of Zeolites it is therefore unsurprising that an enormous body of papers and patents have accrued in this field. For example, U.S. Pat. No. 5,417,949 (Mobil 1995) describes a process for converting NOx with $NH_3$ to $N_2/H_2O$ under lean conditions using a molecular sieve having a Constraint Index of up to about 12, with the molecular sieve selected from the group having the structure of Zeolite Y, Zeolite L, Zeolite β, ZSM-4, ZSM-20, Mordenite, VPI-5, SAPO-11, SAPO-17, SAPO-34, SAPO-37, MCM-36, and MCM-41. Similarly there have been studies addressing the manipulation of the Silica:Alumina characteristics of the Zeolite to enhance activity and hydrothermal durability e.g. U.S. Pat. Nos. 7,118,722, 7,182,927. In addition there has been a considerable body of work examining the synthesis, characterisation and application of proton (U.S. Pat. Nos. 6,569,394 and 5,589,147) and Copper and Iron ion-exchanged Zeolites (U.S. Pat. Nos. 4,961,917, 6,843,971, 7,005,116 and 7,049,261). This large body of research has confirmed the high activity, broad temperature window and improved hydrothermal durability and poison tolerance of Zeolite systems cf. Vanadia-titania based SCR systems. However Zeolite SCR catalysts are not without drawbacks. For example extended or severe hydrothermal aging results in dealumination of the framework structure with a resultant loss of acidity (Y. Cheng, J. Hoard, C. Lambert, J-H. Kwakb and C. H. F. Peden, Catal Today 36 (1-2), (2008), 34-39). Moreover, HC retention in the Zeolite structure has been demonstrated as a limitation of conventional Zeolites due to accumulation of carbonaceous deposits and resultant active site blocking (Y. Huang, Y. Cheng and C. Lambert, SAE Int. J. of Fuels & Lubricants, vol. 1 (2009), 466-470). Additionally it has been demonstrated that combustion of retained HC, e.g. during post-injection, in ion-exchanged Zeolites can result in uncontrolled HC combustion and internal exotherm which steams and extracts cations from the Zeolite (J. Girard, R. Snow, G. Cavataio and C. Lambert, SAE 2008-01-0767).

More recently a new sub-class of Zeolite and Zeotype (structural isotypes/isomorphs based upon for example alumina-phosphate, silica-alumina-phosphate i.e. ALPO, SAPO) materials for SCR have been introduced. These materials are based upon so-called '8-ring' structures of the structure type CHA (Chabazite) and related structure types e.g. AEI, AFT, AFX, DDR, ERI, ITE, ITW, KFI, LEV, LTA, PAU, RHO, and UFI. These alternate Zeolite structures show promise in addressing issues related to HC (hydrocarbon) uptake/site blocking and also for limiting deactivation by in-situ combustion, as the 'critical-diameter' of the Zeolites are so small that ingress of HCs into the internal porosity of the materials is limited, e.g. for CHA the channel diameters are 3.8*3.8 Å, thus only limited quantities of small HC molecules may enter. Moreover it has been found that both Chabazite ('pure' aluminosilicate) and SAPO-34 (silica-alumino-phosphate isomorph) display a surprisingly high hydrothermal durability and retain good activity after hydrothermal aging cycles as high as 900° C. (WO 2008/106519 A1 and WO 2008/118434 A1 for Chabazite and SAPO34 resp.). However, notwithstanding these significant improvements in durability and HC poisoning tolerance it should be highlighted that these new Zeolites/Zeotypes still present common issues to all Zeolites in that they are comparatively expensive, time consuming to produce, and require specialised autoclaves operating at high pressure and temperature and have a somewhat limited supply base to serve the forthcoming volumes required to fulfil market requirements in the coming years.

In order to address the cost and supply concerns for Zeolite SCR catalysts there have been many efforts to develop simpler, robust mixed metal oxide catalyst systems of comparable efficacy. For example U.S. Pat. No. 5,552,128 describes the use of acidic solid Group IVB metal oxide modified with oxy-anion Group VIB metal and containing at least 1 metal ex Group IB, WA, VB, VIIB, VIII and mixtures thereof, with Ni, Fe, Mn, Sn, Cu, Ru and mix Group IVB is Zr and Group VIB is W being especially favoured. More recently there have also been efforts to develop SCR catalysts based upon Zr—Si-Oxide, Zr—Si—W-Oxide and Zr—Ti—Si—W Oxides (WO/2008/046920, WO/2008/046921 and SAE 2007-01-0238). The use of $TiO_2$-containing systems is also recorded in JP 52-42464 which cites a catalyst containing 50-97 (atomic %) titanium oxide as its first active ingredient, 2-49 (atomic % percent) cerium oxide as its second active ingredient, and 1-30% (atomic percent) of at least one compound selected from molybdenum oxide, tungsten oxide, vanadium oxide, iron oxide, and copper oxide as its third active ingredient with illustrative examples including Ti—Ce—Cu, Ti—Ce—Fe, Ti—Ce—W and Ti—Ce—Mo. Additionally WO/2008/150462 describes a complex multi-phase oxide catalyst system with high activity for $NH_3$—SCR of NOx comprising at least two components wherein 'the first component is selected from oxides of a transition metal other than the metal contained in the second component', with $V_2O_5$, $MoO_3$, $WO_3$, and mixtures and combinations thereof being preferred. This active phase is present at 0.1% to 30% and is supported by a second component from oxides of Cerium or Lanthanide or Cerium/Lanthanide/Titanium/Zirconium or combinations and mixtures thereof. Further examples of oxide base SCR may be found in EP 1736232 which describes a complex oxide consisting of 2 or more oxides selected from silica, alumina, titania, zirconia, and tungsten oxide; and a rare earth metal or a transition metal except Cu, Co, Ni, Mn, Cr, and V. The use of Zirconium oxide support for SCR catalysts is also recorded in N. Apostolescu et al. in Appl Catal B: Env 62 (2006) 104-114, for a 1.4 mol % Fe and 7.0 mol % $WO_3$ on $ZrO_2$ catalyst. Similarly U.S. Pat. No. 5,552, 128 cites Group IVB (Zr) metal oxide as a support with catalytic modification being provided by an oxyanion of a Group VIB metal (e.g. W) with further promotion by use of at least one metal selected from the group consisting of Group IB, Group IVA, Group VB, Group VIIB and Group VIII (Fe) and mixtures thereof. Additionally sulphated Zirconia may be employed as a support for an SCR catalyst, again in conjunction with specific transition metals e.g. tungsten or molybdenum oxide (JP 2003-326167). More recently US 2008/0095682 A1 proposes the use of composite oxides based upon Cerium Zirconium with additionally containing Mo/Mn W, Nb, Ta. Further examples may also be found in GB 1473883, WO/2008/085265 and WO 2009001131. However, in all cases the activity displayed by such systems remain somewhat below that observed by the preferred Zeolite systems, particularly after hydrothermal aging cycles.

Hence what is required in the art is a technology to provide highly active and selective SCR catalysis with improved hydrothermal durability and decreased cost. Additionally the new technology must provide the aforementioned improvements whilst retaining a wide operating range, tolerance to high $NO_2$ contents and also possessing enhanced resistance to HC and SOx poisons present in the exhaust stream to fulfil the requirements of modern multi-brick emission control architectures.

The invention disclosed herein describes active lattice based catalysts for the selective catalytic reduction (SCR) of Oxides of Nitrogen (NOx) using a $NH_3$ or an appropriate organo-Nitrogen compound. A method for the conversion of the oxides of nitrogen to nitrogen is explained wherein said nitrogen oxides are contacted with a nitrogen-containing reductant in the presence of a base metal oxide catalyst comprising:

(a) a >95% phase pure crystal lattice structure, as determined by conventional powder X-Ray Diffraction (XRD) method; and (b) catalytically active cations dispersed within said lattice structure, without the formation of additional phases, wherein the phase pure lattice structure is derived from the oxides of zirconium.

Further a method is disclosed, wherein the phase pure lattice structure is preferably derived from the oxides of cerium-zirconium solid solution, more preferably form a cerium-zirconium-yttrium solid solution. In addition the active dispersed cations are selected from 1 or more elements of the group consisting of transition metal series of the Periodic Table of Elements, alkaline earth metal group of the Periodic Table of Elements and alkali metal group of the Periodic Table of Elements. A next method is directed to a process, wherein the active dispersed cations are selected from the group consisting of Cu, Fe, Nb, Ta, W and mixtures thereof.

The method of the invention runs at a temperature from about 150° C. to about 700° C. It is preferable if the conversion of oxides of nitrogen to nitrogen is performed under conditions of an excess of oxygen. Further a source of nitrogen-containing reductant is introduced to give an effective NH3:NOx ratio (a ratio) at catalyst inlet of 0.5 to 2. The NO:NO2 ratio recorded at the inlet of the catalyst is from 1:0 to 1:3 by volume. A next method is depicted, wherein an oxidation catalyst is employed prior to the base metal oxide (SCR) catalyst to enable generation of NO2-enriched exhaust gas.

A further method according to the invention is noted, wherein the catalytically active cation doped lattice as a catalyst comprises incorporation of a phase pure crystal lattice structure with catalytically active cations without the formation of additional phases, such that phase analysis by conventional x-ray diffraction (XRD) method reveals a substantially phase pure material (>95%), with bulk metal oxide dopant phase being recorded at <5% and dopant metal oxide particle size, as determined by line-broadening/Scherrer equation determination, is about 30 Å to about 100 Å.

In a preferable manner of the invention the catalytically active cation can be doped into the lattice structure from about 0.01 wt % to 15 wt %, based upon the total mass of the catalyst. Preferably the catalytically active cation is doped into the lattice structure from about 0.1 wt % to 10 wt %, based upon the total mass of the catalyst and more preferably from about 1 wt % to 7.5%, based upon the total mass of the catalyst.

A further method is set out, wherein the catalytically active cation doped lattice material is produced by a direct synthesis via co-precipitation. Optionally the method according to the invention uses a catalyst which additionally contains a co-catalyst based upon a zeolite/zeotype or metal exchanged zeolite/zeotype. Preferably the zeolite/zeotype or metal exchanged zeolite/zeotype is from about 1 wt % to about 35 wt % of total catalyst mass. More preferably the zeolite/zeotype or metal exchanged zeolite/zeotype is selected from the group consisting of ZSM5, zeolite β, chabazite, SAPO-34, zeolites characterized by a structure containing an 8-ring pore opening structure and mixtures thereof. In addition the metal employed in the metal exchanged zeolite/zeotype is selected from the group consisting of copper, iron and mixtures thereof.

The active lattice based catalysts herein employ the favourable structural matrices of ZrOx, Zr—CeOx and Zr—Ce—REOx crystal structures with their proven hydrothermal durability. Into these durable matrices one may disperse active cations (redox, acid or alkali/alkaline, or transition metal) with high (atomic) dispersion both without negatively impacting redox function but additionally incorporating a secondary catalytic site and function. It is proposed, and will be demonstrated, that stable and active $NH_3$/Urea-SCR catalysts may be derived from employing one or a combination of ZrOx, CeZrOx or CeZrREOx (RE=Y or one or more Rare Earth metals or combinations of Y and Rare Earth Metals) phases as a host matrix for active cations which facilitate SCR catalysis. As used herein, the term "Rare Earth" means the 30 rare earth elements composed of the lanthanide and actinide series of the Periodic Table of Elements.

Specifically, it is proposed that high activity is obtained by the application of the aforementioned solid solutions that have been promoted by the inclusion of specific di-valent (e.g. Ca, Cu, Sr etc), tri-valent (e.g. Co, Fe, Mn etc.) and Penta-valent (e.g. Nb, Ta) dopants at high dispersion within the oxide matrix. The choice of base, i.e. non-Precious Group, metal or metal(s) to be incorporated within the oxide matrix is based upon various properties proposed to facilitate the SCR process. For example, but without wishing to be bound by theory, the dopant may enhance redox function and therefore enhance $NH_3$ activation (H abstraction) or NO activation/oxidation. Alternatively the dopant may be selected to enhance the acidic character of the lattice structure which in turn facilitates $NH_3$ adsorption and activation. A further possibility is the use of a chemically basic dopant e.g. alkali, alkaline earth metal or transition metal which is introduced to provide highly dispersed centres for the adsorption of NOx to facilitate SCR. Finally the cation may posses a combination of these characteristics e.g. redox acid, however in all cases the choice of cation dopant will be based upon chemical characteristics known to be beneficial for Urea/$NH_3$ SCR. Thus typical dopants could comprise Ca, Sr, Cu, Mn, Fe, Nb etc.

In another aspect, the invention relates to a method for making a catalytically active cation doped lattice as a catalyst comprising incorporating a phase pure crystal lattice structure with catalytically active cations without the formation of additional phases, such that phase analysis by conventional x-ray diffraction method reveals a substantially phase pure material (>95%), with bulk metal oxide dopant phase being recorded at <5% and dopant metal oxide particle size, as determined by line-broadening/Scherrer equation determination, is about 30 Å to about 100 Å.

The catalytically active cation doped lattice material can be produced in a number of ways such as by a direct synthesis via co-precipitation.

In another way, the catalytically active cation doped lattice material is produced by contacting the lattice material with a precursor solution of dissolved cations under conditions of high pH (pH>8, preferably 8, 1-10) and low hydronium ion ($H_3O+$) content, followed by drying and calcination to remove any solvent and to convert the cations into highly dispersed metallic or metal oxide ensembles or clusters.

Also, the catalytically active cation doped lattice material can be produced by contacting the lattice material with a precursor solution of dissolved cations and an organic depositing reagent which is an aqueous soluble organic capable of forming a hydrogen-bonded, gel-like matrix when the water or other solvent is removed by heating; said gel-like matrix supporting ions of precursor cations to maintain high homogeneity and high dispersion within and on the lattice.

Still further, the catalytically active cation doped lattice material is produced by contacting the lattice material with a precursor solution of dissolved cations under conditions of low pH (pH>4, preferably 4,1-4,5) and high hydronium ion ($H_3O+$) content, followed by drying and calcination to remove any solvent and to convert the cations into highly dispersed metallic or metal oxide ensembles or clusters.

In another embodiment, the present invention describes a method for removal of NOx pollutants from the exhaust stream of a diesel/compression ignition engine. This is achieved by contacting the NOx-containing exhaust stream with the novel catalysts described herein in the presence of Urea, Urea-derived fraction, $NH_3$ or other N-based reductant, where the catalyst comprises one or more active components derived from phase pure cation doped crystal lattice structures wherein the crystal lattice is based upon ZrOx, CeZrOx or CeZrREOx.

The use of ZrOx, CeZrOx or CeZrREOx in automotive emissions control catalysis applications is itself not unprecedented. Indeed, application of solid electrolytes with crystal lattices based on Zirconia ($ZrO_2$), thorium ($ThO_2$), and ceria ($CeO_2$) doped with lower valent ions have been extensively studied for emissions control, e.g. U.S. Pat. Nos. 6,585,944 and 6,387,338. This work has shown that the introduction of lower valent ions, such as Rare Earths and Alkaline Earths (strontium (Sr), calcium (Ca), and magnesium (Mg)), results in the formation of oxygen vacancies in order to preserve electrical neutrality. The presence of the oxygen vacancies in turn gives rise to oxygen ionic conductivity (OIC) at high temperatures (>800° C.). Typical commercial or potential applications for these solid electrolytes thus not only include three-way-conversion (TWC) catalysts but also includes their use in solid oxide fuel cells (SOFC) for energy conversion, oxygen storage (OS) materials in, electrochemical oxygen sensors, oxygen ion pumps, structural ceramics of high toughness, heating elements, electrochemical reactors, steam electrolysis cells, electrochromic materials, magnetohydrodynamic (MHD) generators, hydrogen sensors, catalysts for methanol decomposition and potential hosts for immobilizing nuclear waste.

Both $CeO_2$ and $ThO_2$ solid electrolytes exist in the cubic crystal structure in both doped and undoped forms. In the case of doped $ZrO_2$, partially stabilized $ZrO_2$ consists of tetragonal and cubic phases while the fully stabilised form exists in the cubic fluorite structure. The amount of dopant required to fully stabilize the cubic structure for $ZrO_2$ varies with dopant type. For Ca it is in the range of about 12-13 mole %, for $Y_2O_3$ and $Sc_2O_3$ it is >18 mole % of the Y or scandium (Sc), and for other rare earths (e.g., $Yb_2O_3$, $Dy_2O_3$, $Gd_2O_3$, $Nd_2O_3$, and $Sm_2O_3$) it is in the range of about 16-24 mole % of ytterbium (Yb), Dy, gadolinium (Gd), Nd, and samarium (Sm).

As indicated, solid solutions consisting of $ZrO_2$, $CeO_2$ and trivalent dopants are widely used in three-way-conversion (TWC) catalysts as oxygen storage (OS) materials and are found to be more effective than pure $CeO_2$ both for higher oxygen storage capacity and in having faster response characteristics to air-to-fuel (A/F) transients. In addition there is increasing use of comparable materials in fuel lean emission control applications e.g. the Diesel Oxidation Catalyst (U.S. Ser. No. 12/408,411), the Diesel Catalysed Particulate Filter (U.S. Ser. No. 12/363,329) and the NOx Storage/Regeneration trap (U.S. Ser. No. 12/240,170).

In this application, we expand upon some of these concepts and take specific advantage of the favourable and durable structural matrices of ZrOx, Zr—CeOx and Zr—Ce—REOx crystal structures into which the active cations can be dispersed with high dispersion both without negative impact to redox function whilst incorporating a secondary catalytic site and function. In fact, it has been shown the incorporation of base metal cations can result in a dramatic and durable promotion of the normal redox characteristics of OS materials (see for example U.S. Pat. Nos. 6,387,338, 6,585,944, 6,605, 264 and U.S. patent application Ser. Nos. 12/363,310, 12/363,329, 12/408,411). An analogy to this idea is the addition of $Ce^{4+}$ to the $ZrO_2$ matrix. The role of Ce in the catalytic oxidation of CO for example is based upon its redox activity as follows: $Ce^{3+}+O_2 \rightarrow O_2^-+Ce^{4+}$, followed by reaction of the $O^{2-}$ anion with CO(NO) to give $CO_3^{2-}$ ($NO_3$) and subsequent decomposition to $CO_2$ ($NO_2$) and O— and finally regeneration of $Ce^{3+}$. This reaction cycle can occur on pure $CeO_2$ and the nature/energy barrier of the $Ce^{4+} \leftrightarrow Ce^{3+}$ redox cycle can be probed using TPR (Temperature Programmed Reduction) with reduction peaks for surface $CeO_2$ at 350-600° C. No bulk $CeO_2$ is reduced at these temperatures the crystal lattice as the $CeO_2$ cannot accommodate formation of the larger $Ce^{3+}$ ions and hence O mobility away from the bulk in order to preserve electrical neutrality cannot occur. However, when $Ce^{4+}$ ions are dispersed into the $ZrO_2$ lattice the redox activity of $Ce^{4+}$ is not negatively impacted but in fact is greatly enhanced, not primarily through modification of the inherent chemistry/reducibility of the $Ce^{4+}$ ion itself but more by a geometric mechanism as noted above where all the $Ce^{4+}$ ions are now accessible. Further, the presence of the $ZrO_2$ matrix greatly stabilises the material from surface area loss, crystallite growth and loss of porosity. $ZrO_2$ may also inhibit or protect $Ce^{4+}$ from formation of undesirable stable compounds with the acidic exhaust components such as $CO_2$ and $SO_2$ due to the inherent acidity of $ZrO_2$ relative to $CeO_2$. Thus the aim is to incorporate additional functional cations into the crystal lattices of the aforementioned ZrOx, CeZrOx and CeZrREOx materials to achieve similar chemical and accessibility benefits and thus facilitate enhanced SCR performance.

The ZrOx material of the invention is characterised as having >75% Zr as oxide and <25% of cation dopants to provide both functionality and ensure the material is present as an active and single phase pure cubic component. The CeZrOx and CeZrREOx materials of the invention are an OIC/OS material having about 0.5 to about 95 mole % zirconium, about 0.5 to about 90 mole % cerium, and optionally about 0.1 to about 20 mole % RE, wherein RE is selected from the group consisting of rare earth metal(s), alkaline earth metal(s), Yttrium and combinations comprising at least one of the foregoing, based upon 100 mole % metal component in the material. Again the materials are further characterised by a high phase purity, as determined by conventional powder X-Ray Diffraction (XRD) method. The phase purity of all materials is preferably >95% i.e. <5% of additional phases and most preferably >99% single phase. All of the crystal materials are further characterised by having fresh surface areas, as determined by the standard N2 physisorption (BET) method of >25 m$^2$/g and more preferably >50 m$^2$/g. The surface area is derived from the porous nature of the materials which may comprise small (<20 nm), or more preferably of medium pore dimension (pore diameter 20<x>100 nm). This 'mesoporosity' is a preferred trait due to the specific enhancements afforded to the catalyst by this textural characteristic e.g. thermal durability, enhanced mass transfer etc.

The use of the ZrOx/CeZrOx/CeZrREOx crystal lattice as a framework for effective dispersion of dopant cations also provides effective tools for control of the fundamental chemical of the subsequent powder. For example, one option for this class of compounds is the control of overall acidity of the support by inclusion of appropriate alkaline or acidic cations as outlined above. Similarly it is possible to control and modify the ionic conductivity characteristics via manipulation of the vacancy density. The vacancy density can be controlled by adding the five valent Nb to the nominally 4-valent/3-valent Zr/RE$^{3+}$ matrix with necessary inclusion of oxygen for electrical neutrality. These type compositions are already covered in U.S. Pat. Nos. 6,585,944 and 6,468,941 and more recently similar compositions have been claimed in WO 2003 082740 and WO 2003 082741 respectively although these patents do not refer specifically to SCR applications or to utilising the crystal lattice system as a generic host matrix for other catalytically active ions. In summary the above represent specific examples of the generic flexibility afforded by this new class of materials and represent a powerful means of addressing a specific catalytic challenge.

Benefits and features include:

a) The ability to introduce cations, catalytically active for the SCR process, at high dispersion within the lattice of the solid solution with minimal disruption of either the redox activity or catalytic function for SCR for ions such as: Ag, Co, Cu, Fe, Mn, Nb etc. In fact incorporation of such ions has been shown to enhance redox activity (U.S. Pat. Nos. 6,387,338, 6,585,944, 6,605,264, U.S. patent application Ser. Nos. 12/240,170 and 12/363,310). The choice of the cations is highly flexible and may include species to promote redox, enhance acidity or basicity or indeed a combination e.g. redox acid.

b) The ability to introduce specific catalytic functions or synergies, for example the combination of a cubic lattice material into which Alkali metal, Alkaline Earth metal or Transition metal is introduced at near atomic dispersion with aforementioned dopant metal chosen so as to provide a means of storing high concentrations of NOx on its surface and retaining such species until their subsequent SCR to N$_2$ may be facilitated.

c) Improved performance and durability of performance due to the inherent stability of the crystal lattice employed as a framework for dispersion of aforementioned cations. The stability of the system and absence of steam leaching effects, as seen for cation-exchanged/impregnated Zeolite systems, provides for this enhanced stability.

d) The ability to engineer specific single phase and phase pure cation doped systems by appropriate selection of co-dopants (Y, La, Gd and other Rare Earths as shown in U.S. Pat. Nos. 6,387,338, 6,585,944 and 6,605,264). The generation of phase pure systems is known, and will be further demonstrated, to provide optimal performance for SCR and other processes. This is in contrast to US 2008/0095682 A1 wherein complex multi-oxide and multi-phase systems dubbed Ce$_a$—Zr$_b$-R$_c$-A$_d$-M$_e$-O$_x$ are claimed as active SCR catalysts.

e) The provision of great flexibility in structural/chemical modification to optimise performance: this can include the use of a wide variety of di- and tri- and penta-valent cations for control of the crystal lattice parameter, maximise phase purity, defect density within the lattice or modify surface acidity/basicity etc.

f) The ability to manipulate and tailor the textural characteristics of the doped lattice system to generate mesoporous systems of high and durable pore volume and surface area. This stable surface area, derived from the large pore system when combined with the high, possibly mono-atomic dispersion of the cations in the lattice, results in high accessibility of the gaseous reactants to the redox active/acidic/basic cations, thereby limiting mass transfer effects and providing associated enhanced performance g) Provision of a lower cost, non Zeolite/Zeotype SCR catalyst with competitive low temperature reactivity, excellent hydrothermal durability and tolerance to general exhaust gas poisons e.g. CO, SOx and especially hydrocarbons. The latter is a known poison of SCR activity due to accumulation of carbonaceous deposits (Y. Huang, Y. Cheng and C. Lambert, SAE Int. J. of Fuels & Lubricants vol. 1 (2009), 466-470). Additionally it has been shown that the rapid combustion of HC retained in ion-exchanged ZSM5 and Zeolite β systems can also result in a catastrophic deactivation due to uncontrolled HC combustion and exotherm which both steams and extracts cations from the Zeolite matrix (J. Girard, R. Snow, G. Cavataio and C. Lambert, SAE 2008-01-0767). These effects are not seen for the new class of lattice dispersed cation catalysts.

h) The synthesis of cation doped lattice or cubic lattice cation doped materials is also simpler, quicker and requires no subsequent post-synthesis processing as is the case for metal exchanged/doped Zeolites. The dispersion of the cations and the framework are also more hydrothermally durable than conventional Zeolite systems.

This strategy contrasts to that of conventional SCR NOx control catalysts in which there are no formal attempts to generate synergy between redox and other desired chemical functions of SCR by the use of a well defined highly durable and poison resistant host matrix. For example while US 2008/0095682 A1 employs Cubic Fluorite phases as a catalytic component, it further discloses the presence of additional phases e.g. MnWO$_4$, thereby conceding the multi-phasic nature of the materials exploited therein.

The above-described and other features will be appreciated and understood by those skilled in the art from the following detailed description, drawings, and appended claims

DETAILED DESCRIPTION OF THE INVENTION

The present invention relates to the development and use of phase pure lattice oxide materials based upon ZrOx, CeZrOx, CeZrYOx, CeZrREOx (where RE=Rare Earth Metal) or CeZrYREOx or mixtures thereof as active catalysts for the SCR of NOx using N-bearing reductant. These lattice materials are further characterised by the presence of catalytically active cations dispersed within the lattice structure such that conventional XRD analysis reveals a highly phase pure material. The cations themselves derive their catalytic efficacy by their intrinsic reactivity which include the characteristics of redox activity, acidic or basic nature or a combination thereof. Thus a redox active cation dopant may increase the rate of $NH_3$ activation (H abstraction) or promote the oxidation of NO to $NO_2$ and thereby facilitate 'fast' SCR. In contrast an acidic cation dopant would likely increase the bonding strength and quantity of $NH_3$ adsorption and hence facilitate its activation whilst the use of a chemically basic dopant would provide highly dispersed centres for the adsorption of NOx to again facilitate SCR. In a further example the cation may exhibit multiple functions e.g. be a redox acid, thereby facilitating activated adsorption of $NH_3$. It must be stressed that such conjuncture notwithstanding the choice of cation or cations doped into the lattice structure(s) are all characterised by their ability to enhance activity for the Urea/$NH_3$ SCR process.

Figure 9A:
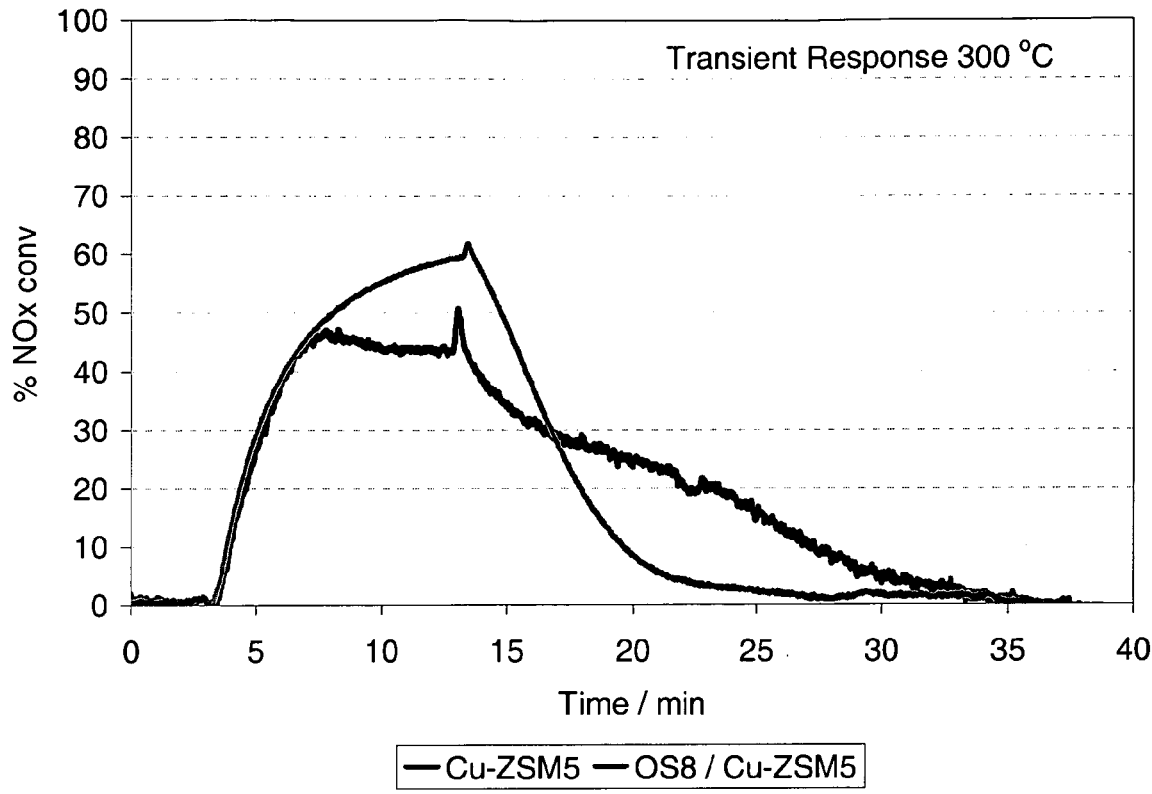
FIGS. 9a and 9b—SGB Analysis of Transient SCR Response at a) 300° C. and b) 400° C. The transient SCR response of the Cu-ZSM5 reference is shown versus OS8-Cu-ZSM5. The test examined meshed powders on the Synthetic Gas Bench (SGB) after 24 h, 10% steam air oven aging at 700° C. Performance is without DOC.
Figure 9B:
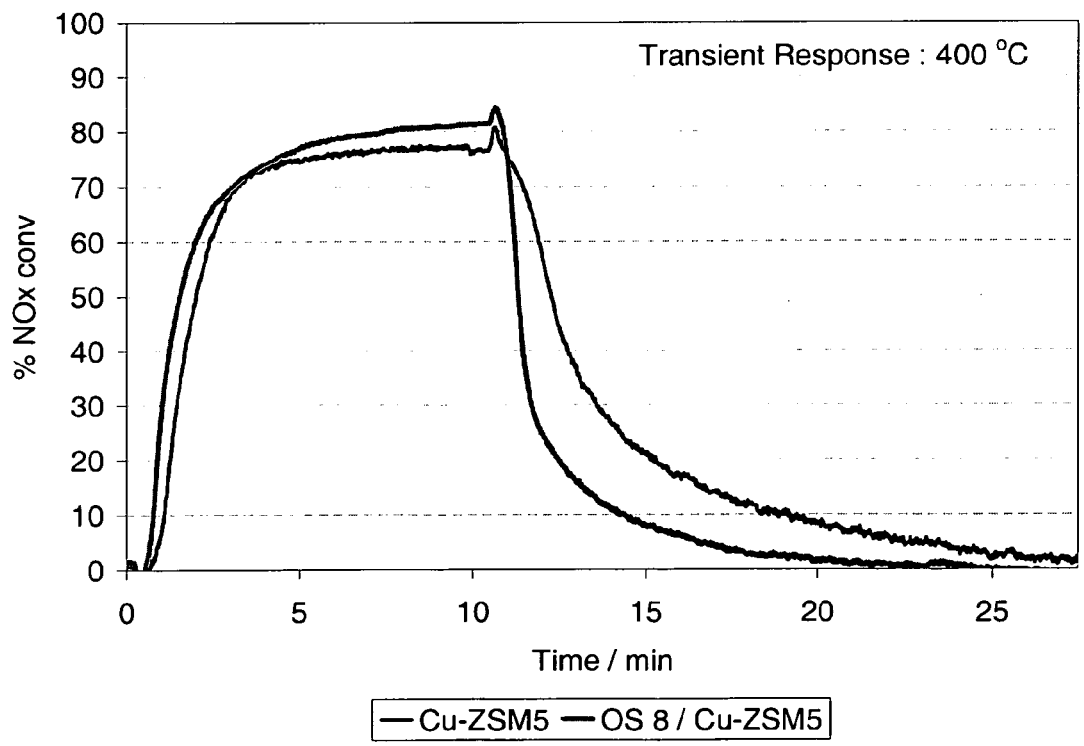

Table 1 summarises the effect of MHSV and DOC on engine dyno performance of the OS-based technologies ex FIG. 9 vs SCR reference after 50 h dyno aging at 660° C.

TABLE 1

| Engine Dyno Test Details | |
|---|---|
| Parameter | Setting |
| Engine setpoint | 2400 rpm |
| Test Temperatures | 400, 350, 300, 250, 200, 175° C. |
| Exhaust Flow | 27 ± 1 g/s |
| Engine backpressure | 11 ± 1 kPa |
| NOx concentration | 320 ± 20 ppm |
| $NH_3$ injection | 320 ± 20 ppm |
| Sampling | 2 Hz for 300 s at each setpoint |

The following set of data include a diverse range of compositions which are listed at the end of the specification as illustrative examples of the flexibility of the Cubic, and more specifically Cubic Fluorite structure as a framework for the stable dispersion of redox and catalytically active cations for SCR catalysis. The data was generated using coated monoliths (typically 4.66 inch round by 6 inch long, 400 cells per square inch) tested and aged in parallel on an engine dynamometer (hereafter dyno) in flowing engine exhaust. During aging flow balancing through all four legs of the exhaust spider was employed to ensure equivalent aging of the monoliths. Typical aging cycles were performed in flowing exhaust at an inlet temperature of 660° C. for 50 hours. Subsequent testing was also performed on the dyno using a Fiat 1.9 L engine and the conditions listed in Table 1. During testing inlet temperature was controlled by means of a heat exchanger assembly and a Diesel Oxidation Catalyst was optionally placed in the exhaust spider, prior to the $NH_3$ injection point, to enable examination of the impact of $NO_2$ generation on the activity of the catalysts.

Figure 1:
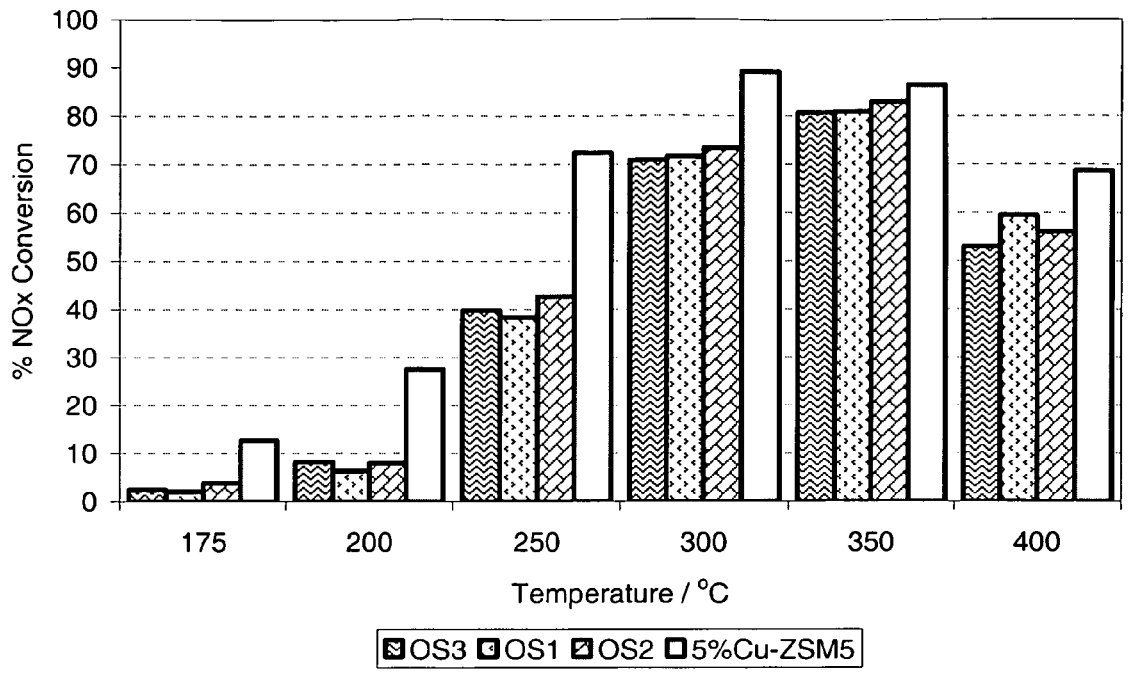
FIG. 1 shows the Engine Dynamometer Performance of OS1, OS2 and OS3 vs commercial SCR reference after 50 h dyno aging at 660° C. Performance is with pre DOC.

FIG. 1 contrasts the performance of three OS based SCR catalysts, OS1, OS2 and OS3, with a conventional Cu-exchanged ZSM5 (MFI with SAR of 40) based technology. Testing was performed with a pre-DOC (70 gcf Pt-only, aged 50 hours at 660° C.). Herein while there is a benefit for the commercial reference the three OS technologies, all coated at only 2 g/in$^3$ total washcoat load and only 1.5 g/in$^3$ of active OS, still display good activity with peak NOx conversions of >80% at 300° C. Thus it is apparent that dispersion of Fe, Nb or a combination of the two cations with a CeZrREOx lattice provides for effective NOx reduction chemistry. It should be stressed that in the absence of these cations activity for the CeZrREOx is neglible. However, given the very similar performance characteristics of the three samples it is not possible to differentiate activity based upon any specific structure-function relationship other than that activity is correlated to cationic dispersion in lattice. The compositions for OS1, OS2, OS3 and others, are set forth in a list at the end of the specification.

Figure 2:
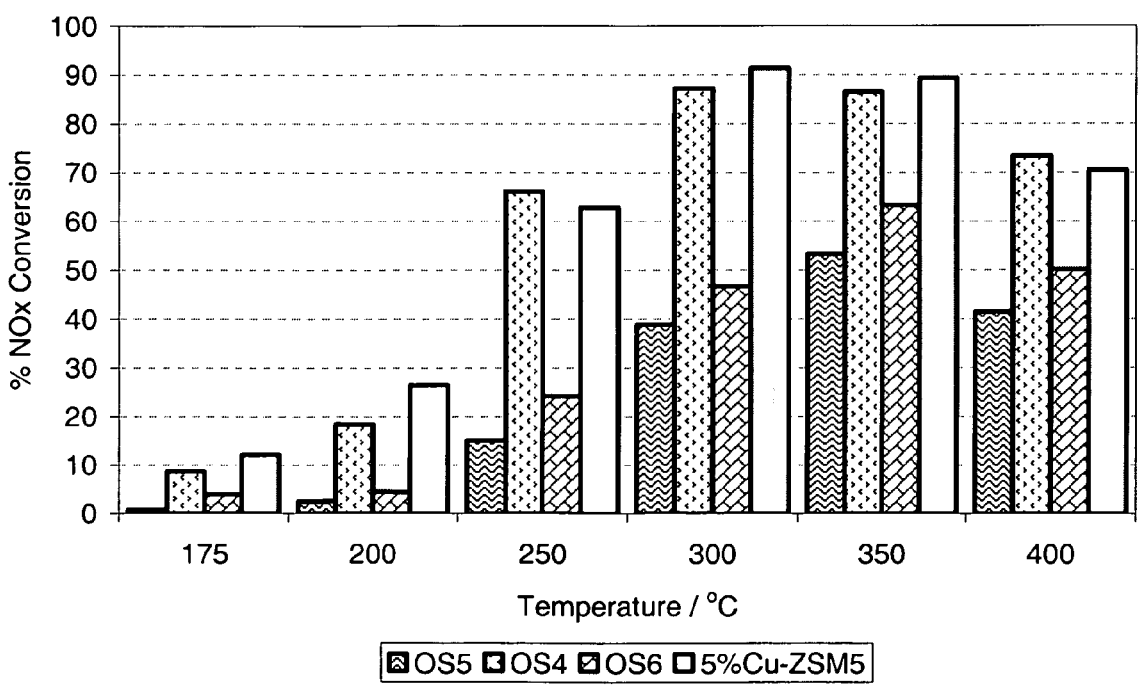
FIG. 2—Dyno Performance of OS materials vs Zeolite SCR ex 50 h/660° C. dyno aging. The Engine Dyno Performance of OS4, OS5 and OS6 is depicted versus commercial SCR reference after 50 h dyno aging at 660° C. Performance is with pre DOC.

The activity of cation-doped CeZrREOx is further illustrated in FIG. 2. Again the aged performance with pre-DOC is compared. In this instance however there are clear differences between the activities of the OS materials. Thus OS4 is seen to significantly higher activity than OS5 and OS6. Indeed, the performance of this material is very similar to that of the commercial reference over the majority of the temperature range examined. Thus at 300 and 350° C. a peak NOx conversion of ca. 87% is seen. This is in contrast to OS5 and OS6 which exhibit peak NOx conversions of ca. 53% and 63% respectively. This marked difference in activity is attributed the structural characteristics of the materials, as determined by conventional X-Ray Diffraction (XRD) analysis and summarised in Table 2. Hence for OS4 the material is a single, phase pure Cubic Fluorite structure i.e. there has been successful incorporation of the Nb cation in the lattice. This is in contrast to OS5 and OS6. Both of these materials exhibit multiple Cubic phases and in the case of OS6 the presence of a bulk phase due to $Nb_2O_5$, thereby confirming that the cation has not been fully incorporated into a cubic lattice. Given the otherwise comparable textural and chemical properties of the three samples we hereby attribute the high activity of OS4 to its phase pure characteristic and the redox and dispersion benefits related thereto.

Table 2 summarises the XRD phase analysis of OS4, OS5 and OS6 powders.

TABLE 2

XRD Phase Analysis of OS4, OS5 and OS6

| | Phase Identification | Lattice Constant of cubic phase(Å) | Size of CeZrO cubic phase (Å) CS | R(%) |
|---|---|---|---|---|
| OS4 | Cubic phase | 5.210(1) | 91(2) | 6.56 |
| OS5 | One major cubic | 5.275(1) | 75(2) | 10.03 |
| | One trace cubic | 5.4395 | too weak to calculate | |
| OS6 | Two segregated cubic phases | 5.273(1) 5.4218 | 83(2) too weak to calculate | 9.57 |
| | $Nb_2O_5$: Orthorhombic 6.167 × 3.648 × 3.917 | | | |

Figure 3:
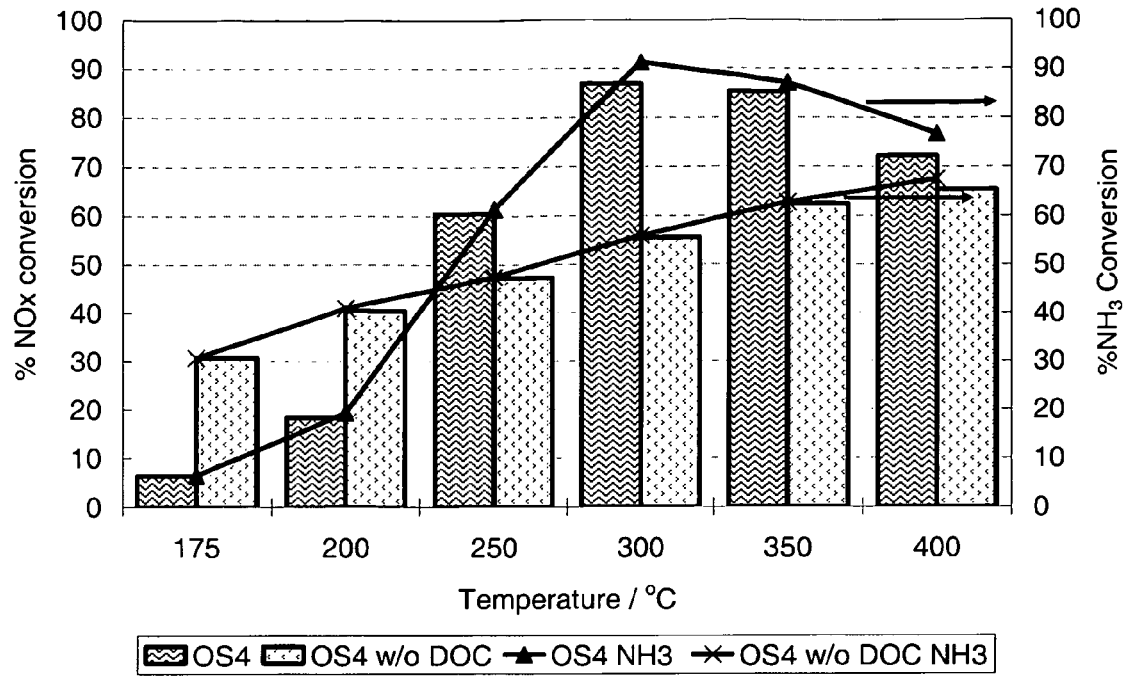
FIG. 3—Dyno Performance of OS4 ex 20 h dyno aging at 830° C., with and without pre DOC. The Engine Dyno Performance of OS4 after 20 h dyno aging at 830° C. is illustrated. Performance is with and without pre DOC.

The performance of OS4 was further examined after severe aging. In the severe aging protocol hydrocarbon was permitted to 'slip' into the SCR catalyst, again at an inlet temperature of 660° C. and subsequently combust over the SCR brick, thereby resulting in an in bed temperature of 830° C. i.e. an internal exotherm of 170° C. was generated in the catalyst, in order to provide a 'worst-case scenario' mode of aging. The catalyst was then re-tested, both with and without pre-DOC giving the results depicted in FIG. 3. These data both indicate almost no loss in performance (cf. with DOC data in FIG. 2) after the severe aging but also show enhanced activity of the formulation in the absence of DOC at lower temperatures, in contrast to general findings which show higher $NO_2$ i.e. with pre-DOC favours low temperature performance. This good activity in the absence of the DOC is exemplary of the high poison tolerance of this approach, with the significant levels of CO, HC, SOx and other species having no impact on activity, especially in the low temperature region where one would normally catalyst poisoning/site blocking phenomena to be most clearly evident. Moreover analysis of the $NH_3$ conversion data reveals another significant difference between the behaviour of the OS4 and a conventional Zeolite SCR technology. For conventional catalysts the performance is limited by selectivity rather than activity i.e. $NH_3$ conversion is also high, but a significant proportion of the activity responsible for the high conversion is derived from parasitic oxidation of $NH_3$ to $N_2$ or more deleteriously to $N_2O$ or NOx i.e. contributing to pollutant generation. In the case of OS4, the selectivity is not limiting with 95-99% (with DOC) and 98-99.8% (without DOC), i.e. $N_2O$ formation or parasitic oxidation of $NH_3$ to NOx is practically zero. Thus it may be seen that providing successful incorporation of the cation into the lattice is achieved, that the result material displays extremely high hydrothermal durability, in excess of that seen for conventional Zeolite-based SCR technologies.

Figure 4:
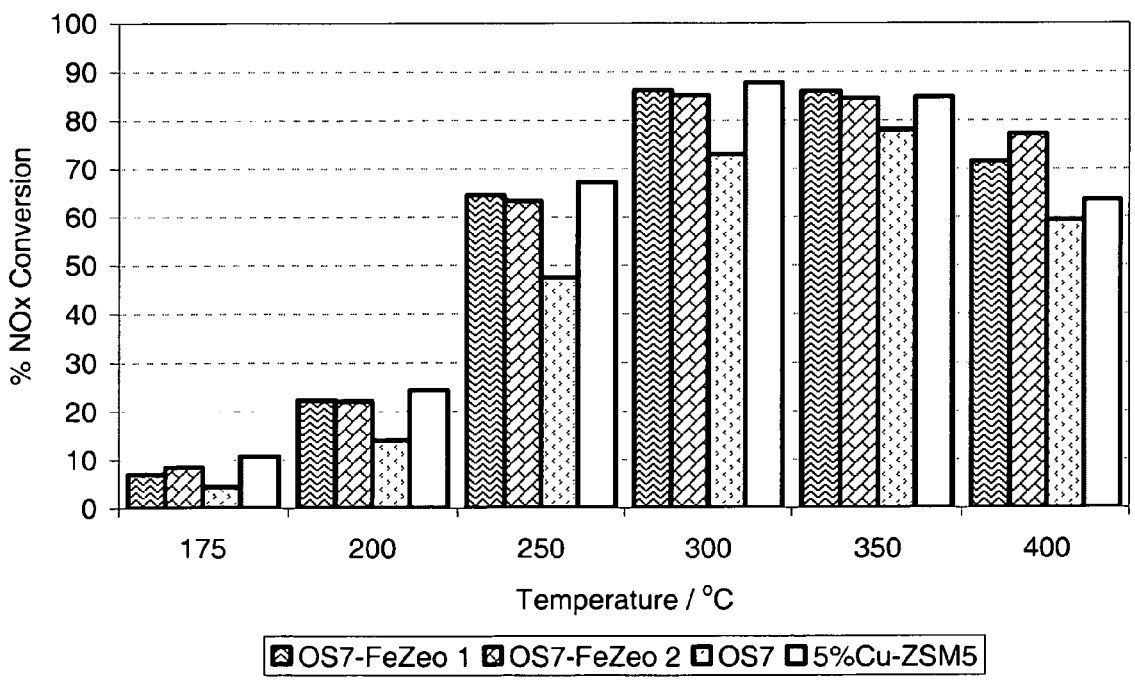
FIG. 4—Dyno Performance of OS7 vs Zeolite SCR ex 50 h/660° C. dyno aging. The Engine Dyno Performance of OS7 with and without 3% Fe-ZSM5 is displayed vs commercial SCR reference after 50 h dyno aging at 660° C. Performance is with pre DOC.

The ability of OS-based catalysts to be combined with conventional Zeolite SCR materials is examined in FIG. 4. Herein the aged activity of Cu-modified OS plus 0, 0.5 and 1 $g/in^3$ is contrasted favourably with the Cu-ZSM5 reference. Indeed, the samples containing Fe-ZSM5 show near identical performance to the reference, even at lower temperatures wherein Fe-Zeolite SCR technology is known to exhibit lower activity. Moreover at higher temperatures these samples offer superior performance to the reference, this is ascribed to the lower rate of parasitic oxidation of $NH_3$ cf. the reference. It should also be noted that there is no appreciable difference in performance between the 0.5 and 1 $g/in^3$ loadings suggesting an effective synergy between the OS and Zeolite even at very low loadings of Zeolite. In contrast the OS7 only sample does exhibit some weakness, principally for temperatures<250° C. At higher temperatures however the activity approaches that of the Zeolite-containing monoliths giving a peak NOx conversion of 79% at 350° C. Thus these data further confirm the effectiveness of cationic species dispersed in a lattice and also their ability to combined with conventional Zeolite technology and provide competitive performance at significantly decreased Zeolite/decreased cost versus a commercial reference.

Figure 5:
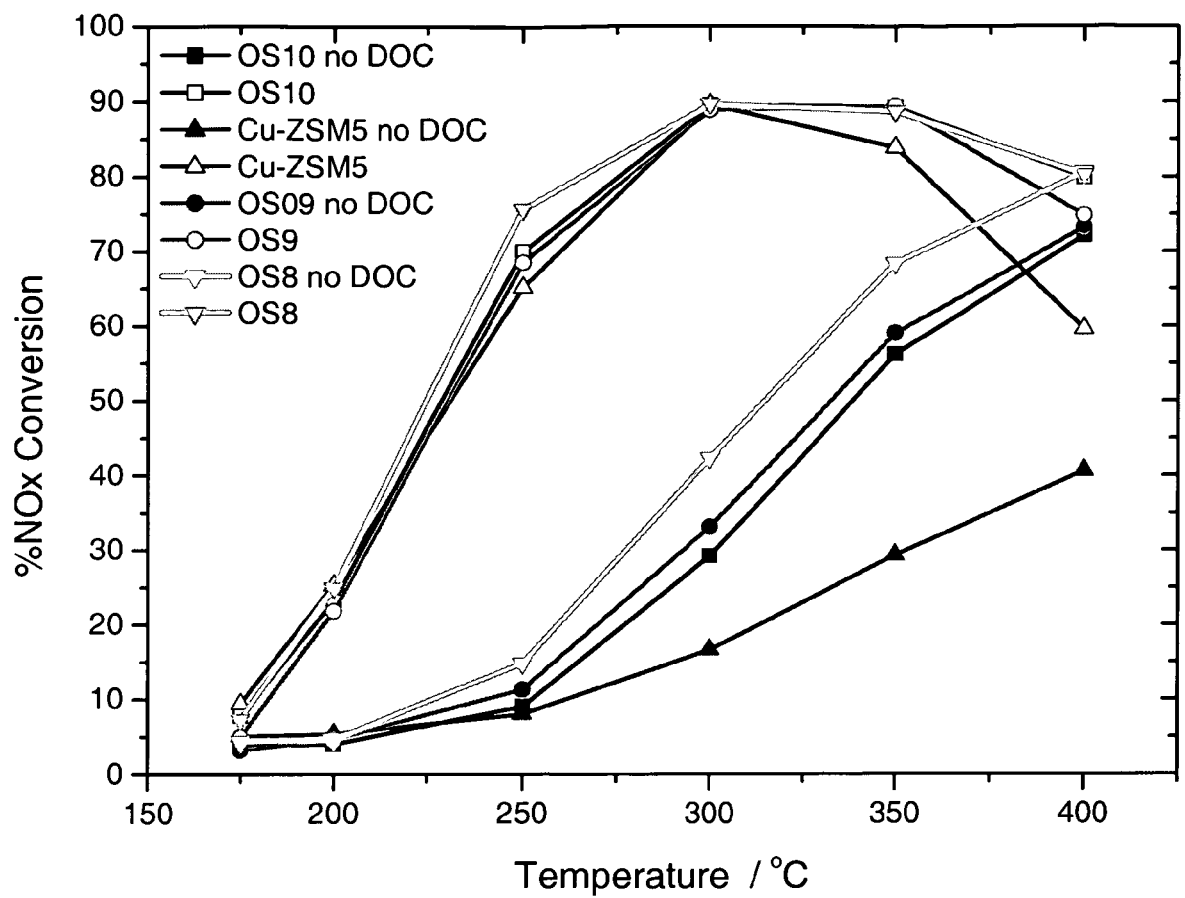
FIG. 5—Dyno Performance of OS materials vs Zeolite SCR ex 50 h/660° C. dyno aging. The impact of a Pre-DOC on the Engine Dyno Performance of OS8, OS9 and OS10 is illustrated vs commercial SCR reference after 50 h dyno aging at 660° C.

The activity of several more variants of cubic lattice dispersed $Nb_2O_5$ were then examined, yielding the performance data of FIG. 5. Herein aged data (50 hours at 660° C. on the dyno) with and without pre-DOC are recorded. The low temperature performances of the OS-containing monoliths for NOx conversion while using the pre-DOC are generally equal to the Cu-ZSM5 reference, with a possible benefit seen for OS8. In contrast at ≧350° C. all the OS-only technologies offer increasingly large benefits vs the reference, this benefit is again ascribed to lower rates of parasitic ammonia oxidation. In comparison the DOC-free activity is quite low for temperatures<250° C. and indeed it is less than seen for the extreme aged sample of FIG. 3, suggesting aggressive aging may actually enhance DOC-free activity for these systems. However in comparison with the conventional SCR technology there are still obvious benefits for the OS-based parts which becomes large with increasing temperature. Thus once again OS8 offers the highest activity with NOx conversions as high 79% recorded at 400° C., which is equal to that seen for the case with the pre-DOC, and about double to that seen for the Cu-ZSM5-based reference. OS9 and OS10 also exhibit good performance with peak $N_2$ yields in excess of 70% observed. Thus there appears to be an especial benefit for $Nb_2O_5$ disposed and dispersed within the cubic structure of the CrZrREOx matrix, a benefit that is not fully realised when the $Nb_2O_5$ is present as 'extra-framework' to lattice as seen in FIG. 2.

Figure 6:
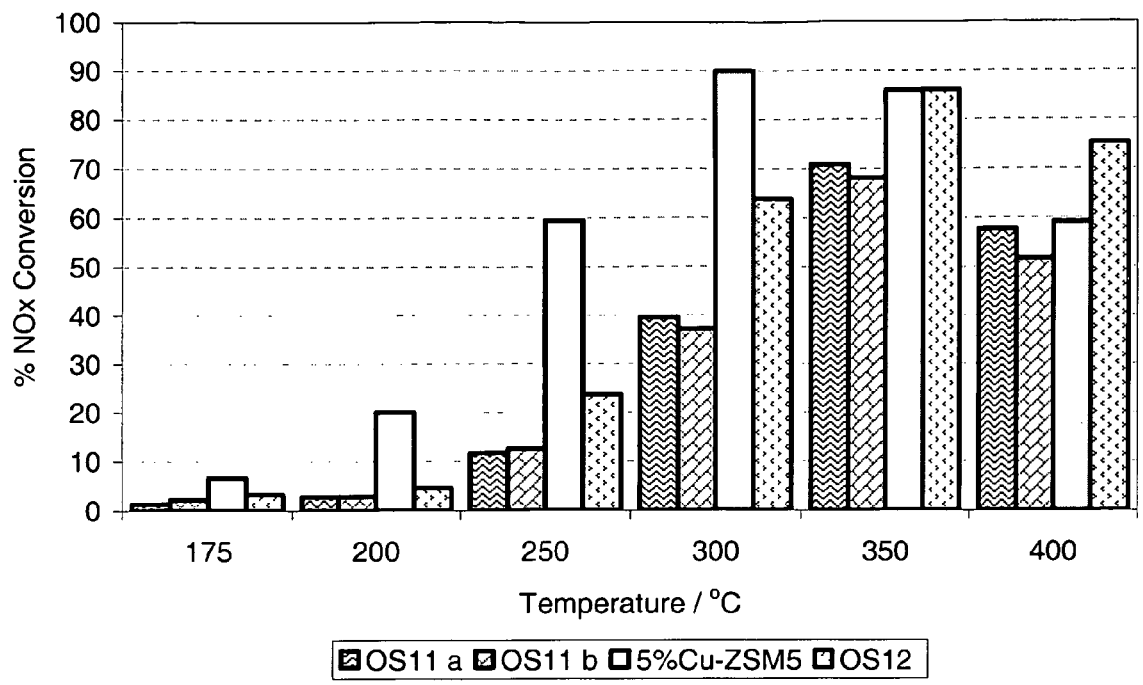
FIG. 6—Dyno Performance of OS materials vs Zeolite SCR ex 50 h/660° C. dyno aging. The Engine Dyno Performance of OS11 variants and OS12 are shown versus commercial SCR reference after 50 h dyno aging at 660° C. Performance is with pre DOC.

Based upon the successful application of redox, acidic and redox acidic cation dopants into the cubic lattice an examination of the use of basic dopants dispersed in the lattice was undertaken (FIG. 6). In this instance the objective was to employ Alkaline earth doped OS systems as a means of trapping NOx upon the surface of the catalyst to thereby facilitate the SCR process. This aim was achieved as all samples demonstrated appreciable activity, in excess to that seen for un-doped CeZrOx. However the activity of this class of OS samples was only moderate low temperature activity cf. commercial reference, with OS12 being the best performer. This is ascribed to the lower ability of these systems to activate $NH_3$ cf. the acidic doped OS systems e.g. OS4, OS8, OS9 and OS10. At higher temperatures, wherein $NH_3$ activation is more facile, this barrier is overcome and the OS12 offers now equivalent and indeed superior performance to the reference and provides a peak NOx conversion of 87%. XRD analysis was again performed with OS12 exhibiting a phase pure character, but OS11 was found to be bi-phasic. This is consistent with previous observations (FIG. 2, Table 2) and reconfirms the correlation of superior activity of phase pure materials i.e. thereby correlating the effective dispersion of the dopant cation into the cubic lattice with high activity.

Table 3 summarizes the XRD phase analysis of OS11 and OS12 powders.

TABLE 3

XRD Phase Analysis of OS11 and OS12

| | Phase Identification | Lattice Constant of cubic phase(Å) | Size of CeZrO cubic phase (Å) | |
|---|---|---|---|---|
| | | | CS | R(%) |
| OS11 | Two segregated cubic phases | 5.300 5.430 | 58(7) too weak to calculate | 6.47 |
| OS12 | Cubic phase | 5.222 | 65(2) | 6.9 |

In order to enhance the activities of the basic doped OS systems three approaches were adopted. The first approach was the addition of a proton Zeolite (H-ZSM5 with a SAR of 40) to boost acidity, the second a further promotion of the combined OS-Zeolite system by the addition of Copper to enhance the redox function, and the third a promotion of the OS only with Copper. In the cases of Copper addition this was achieved via the post-impregnation of $Cu(NH_3OH)_4$— following the method of OS promotion as described in U.S. application Ser. Nos. 12/363,310, 12/363,329 and 12/408,411 which are relied on and incorporated herein by reference. In all cases the various promoters are added due to their ability to increase $NH_3$ adsorption and activation/redox function at lower temperatures, which appears to be a limiting factor based upon the data of FIG. 6. The results of these approaches are summarised in FIG. 7. The data show two of the three approaches provide significant promotion of the OS12 material. Thus the addition of H-ZM5 was found not only to not promote low temperature activity, it actually resulted in a decrease in SCR activity in the intermediate temperature region (250-300° C.). In contrast both samples to which Copper was added showed improved low and intermediate temperature activity. Indeed in the case of the Copper+ZSM5+OS12, the activity is now competitive with the commercial reference sample but at significantly lower Zeolite load/cost. Hence it becomes apparent that the lattice maybe used to effectively disperse combination of cations, introduced during synthesis or by specific post-modification, with each cation imbuing the CeZrREOx with specific functionalities which may operate in a synergistic manner to yield optimal performance and durability in the desired application.

Figure 8:
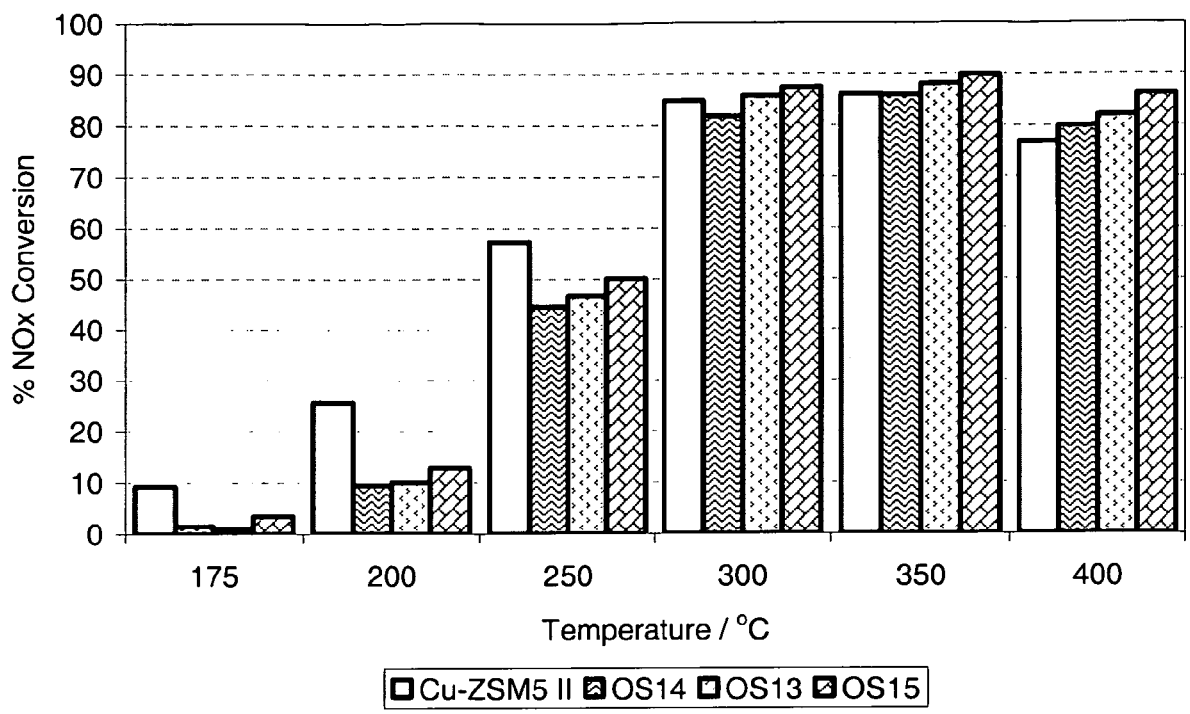
FIG. 8—Dyno Performance of OS materials vs Zeolite SCR ex 50 h/660° C. dyno aging. The Engine Dyno Performance of OS13, OS14 and OS15 is highlighted versus commercial SCR reference after 50 h dyno aging at 660° C. Performance is with pre DOC.

FIG. 8 illustrates the impact of Rare Earth doping, in this instance the specific doping of the lattice with $Pr_6O_{11}$, on the performance of aged Nb-containing OS materials OS13, OS14 and OS15. It should be stressed that for all three OS materials care was taken to balance Y and Nb concentrations in order to facilitate effective Nb incorporation, following the teachings of U.S. Pat. No. 6,605,264. This approach appears effective with all samples displaying comparable performance to the commercial reference thereby confirming the flexibility of the lattice composition. Of the three test parts ranking follows OS15>OS13>OS14, although the differences are small but still may indicate that there are no apparent benefits from Nb contents>10% by mass.

In order to further examine the performance characteristics of OS-based SCR technologies a series of Synthetic Gas Bench (SGB) were performed. In the first of these tests the dynamic SCR characteristics of OS8-CuZSMS was compared to the commercial reference. The test was performed on meshed powders derived from the washcoat slurries used in coating of the full size parts for consistency. The powders were aged in a static oven (24 h, 10% steam/air at 700° C.) prior to testing. The test protocol is as described in Table 4, i.e. first the catalyst is stabilised at temperature in the full reactive gas, with the exception of $NH_3$, at a specific time $NH_3$ is then introduced, at an α=1 (ratio of $NH_3$:NO), and the time response for the catalyst to achieve peak conversion is determined. Once stable SCR activity is realised the $NH_3$ is then removed and the time taken for activity to decay to zero NOx conversion is again monitored. The purpose of the test to compare how well the OS-technologies respond to the dynamic NOx concentration, and hence required $NH_3$, changes that exist under 'real' application conditions.

Table 4 lists the conditions employed in the SGB Transient SCR Activity test.

TABLE 4

SGB transient SCR activity conditions (30,000 h$^{-1}$, balance $N_2$)

| T/° C. | % NO | % $NH_3$ | % CO | % $O_2$ | % $H_2O$ | Time/min |
|---|---|---|---|---|---|---|
| 300 | 0.03 | 0 | 0.01 | 9.95 | 10 | 15 |
| 300 | 0.03 | 0.03 | 0.01 | 9.95 | 10 | 10 |
| 300 | 0.03 | 0 | 0.01 | 9.95 | 10 | 30 |
| ramp | 0.03 | 0 | 0.01 | 9.95 | 10 | n/a |
| 400 | 0.03 | 0 | 0.01 | 9.95 | 10 | 15 |
| 400 | 0.03 | 0.03 | 0.01 | 9.95 | 10 | 10 |
| 400 | 0.03 | 0 | 0.01 | 9.95 | 10 | 30 |

The results of this study are summarised in FIGS. 9a (300° C. test) and 9b (400° C. test). With respect to response upon $NH_3$ introduction the OS8-CuZSM5 offers a small benefit in response at the higher temperature whilst at 300° C. the response is identical. However upon removal of the $NH_3$ the responses of the two technologies are quite different. In both cases the OS8-CuZSM5 exhibits a significantly faster response to $NH_3$ removal. Thus at 300° C., effective NOx conversion drops form 60% at peak to <5% in about 10 minutes. In contrast the commercial sample requires about 20 minutes for NOx conversion to decrease to <5%. The responses at 400° C. while quicker follow the same trend. Hence the OS8-CuZSM5 sample requires about 6 minutes to go from peak conversion to <5% while the commercial Zeolite technology needs about 14 minutes. These data are telling and suggest that a further benefit may be realised from an OS rich, or OS only, technology in that such technologies are better suited to the dynamic responses required in the vehicular application. This benefit is ascribed to the lower $NH_3$ uptake of these materials and also consistent with the higher selectivity/lower $NH_3$ parasitic oxidation of such materials. Hence unlike a Zeolite or Zeotype material the OS technologies do not introduce a large $NH_3$ adsorption which in turn enables a better calibration of the required $NH_3$ injection concentration to achieve the desired a ratio to obtain peak performance without wasting reductant by over-dosing or contributing to NOx formation by rapid oxidation of 'excess' $NH_3$ chemisorbed within the Zeolite.

Figures 10A, 10B:
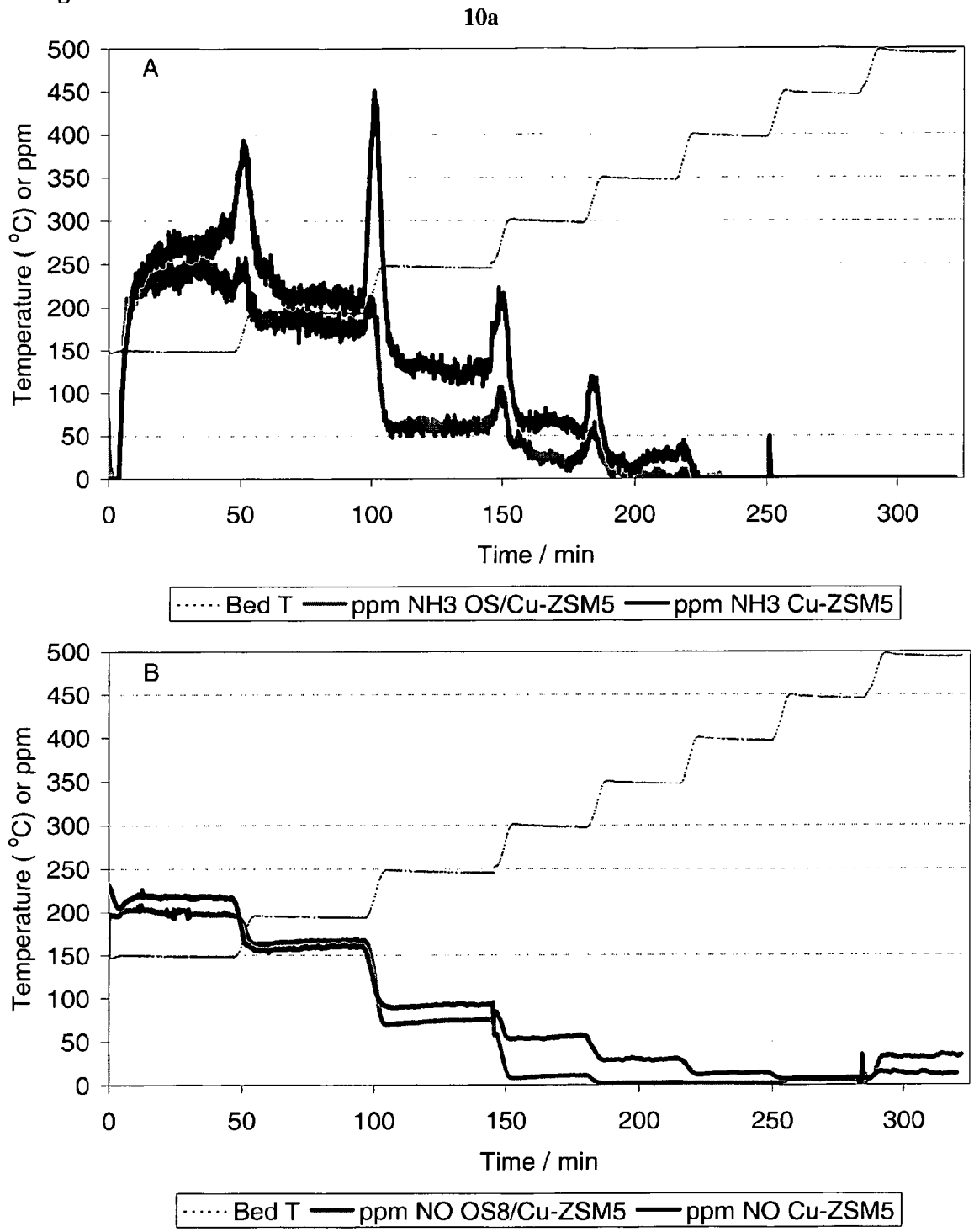
FIGS. 10a and 10b—SGB Analysis of $NH_3$ 'Plume' and SCR activity during Temperature ramp. The $NH_3$ desorption/ 'plume' responses of the Cu-ZSM5 reference is compared versus OS8-Cu-ZSM5. The test examined meshed powders on the Synthetic Gas Bench (SGB) after 24 h, 10% steam air oven aging at 650° C.

The second performance characteristic of OS-based SCR examined on the SGB was the $NH_3$ desorption properties under temperature excursions, again in an attempt to examine the impact of the dynamic operating conditions of the vehicle. The tests were performed using 0.03% NO, 0.03% $NH_3$, 9.95% $O_2$, 0.01% CO, 5% $CO_2$, 10% $H_2O$ balance $N_2$ at 30,00 h$^{-1}$. In the tests the sample was stabilized/soaked at each temperature and the performance determined prior to increasing the temperature, in full reactive gas mix. During the temperature step the activity and any desorption of $NH_3$ monitored. The sample was then stabilized at the next temperature, with the time taken for stability also recorded. The temperature steps and 'soak' times employed were as follows: 150/45 min, 200/45 min, 250/45 min, 300/30 min, 350/min, 400/30 min, 450/30 min, 500/30 min. FIGS. 10*a* ($NH_3$ conversion/desorption) and 10*b* (NOx ppm outlet) illustrate the response of OS8-CuZSM5 versus Cu-ZSM5 (tested as oven aged powders—28 hours 650° C. 10% steam air). Both technologies achieve stabilisation of NOx conversion within the first few minutes of each soak step with the exception of the lowest temperatures of (especially) 150 and 200° C., in agreement with FIG. 9, wherein an induction period is observed. In contrast $NH_3$ conversion and desorption responses shows marked differences between the technologies. In both cases initial $NH_3$ conversion at 150° C. is very high with 0 ppm observed. This is ascribed to a combination of $NH_3$ adsorption and conversion. However, over the next ca. 15 minutes conversion is seen to decrease and stabilise with average ppm $NH_3$ out of 265 and 245 ppm for the reference and OS8-CuZSM5 respectively. Then as the temperature is ramped to 200° C., and indeed for each subsequent temperature ramp to 350° C., there is a large desorption of $NH_3$. This 'plume' of $NH_3$ is seen for both catalysts, with the extent of plume being directly related to catalyst composition. Thus the OS8-CuZSM5 has a peak $NH_3$ desorption of only about 30-40 ppm higher than the steady state conversion seen immediately prior to the onset of the ramp. In contrast the commercial Cu-ZSM5 exhibits much larger plumes which vary with temperature step as 120, 240, 85 and 85 ppm peak above previous steady state conversion. These data highlight a fundamental weakness of this class of technology since such large emissions are not permissible in a vehicular application. Thus a further benefit of the OS-containing washcoat is the ability to provide competitive NOx conversion over the entire temperature region, each after aging, but with enhanced transient SCR function and low $NH_3$ slip during temperature transients.

Table 5 shows the Effect of MHSV and DOC on Engine Dyno Performance of OS only and OS+Zeolite based technologies after 50 h dyno aging at 660° C.

TABLE 5

Effect of MHSV and DOC (w) on Dyno Performance of OS materials vs Zeolite SCR ex 50 h dyno aging at 660° C.

| | CuZSM II with DOC | OS9 with DOC | OS8CuZSM with DOC | CuZSM II | OS9 | OS8CuZSM |
|---|---|---|---|---|---|---|
| | | | 22 g/s flow | | | |
| 175 | 44.4 | 35.5 | 42.3 | 33.3 | 26.7 | 22.3 |
| 200 | 51.3 | 41.4 | 44.4 | 41.4 | 31.9 | 34.4 |
| 250 | 88.4 | 85.6 | 82.6 | 54.5 | 49.5 | 43.5 |
| 300 | 97.3 | 95.5 | 93.1 | 65.3 | 68.5 | 54.5 |
| 350 | 97.5 | 99.5 | 99.5 | 78.7 | 83.6 | 69.4 |
| 400 | 96.4 | 99.2 | 94 | 90.1 | 94.2 | 83.6 |
| | | | 33 g/s flow | | | |
| 300 | 94.3 | 98.4 | 98.7 | 56.4 | 54.5 | 44.2 |
| 350 | 98.5 | 99.5 | 99 | 68.2 | 71.3 | 56.9 |
| 400 | 92.1 | 94.6 | 88.3 | 79.4 | 85.6 | 71.2 |
| 450 | 88 | 89.7 | 87.8 | 88.3 | 87.8 | 79.3 |
| | | | 44 g/s flow | | | |
| 300 | 83.2 | 84.6 | 81.9 | 44.4 | 48.5 | 37.8 |
| 350 | 93.1 | 96.4 | 88.6 | 52.5 | 60.4 | 49.3 |
| 400 | 88.3 | 89.3 | 85.2 | 64.3 | 73.7 | 63.8 |
| 450 | 86.8 | 87.5 | 80.4 | 75.4 | 79.6 | 74.7 |
| 500 | 85.4 | 84.1 | 79.5 | 80.8 | 81.5 | 79.1 |

Table 5 summarises a further dyno study; herein the aim was to examine the impact on flow rate (Mass Hourly Space Velocity—MHSV) and pre-DOC on performance. The aged catalysts tested were selected from those described in FIG. 5. The catalysts were tested on a second dyno using a larger Duramax 6.6 litre diesel engine, which enabled higher range of flows (22+/−2 g/s, 33+/−2 g/s and 44+/−2 g/s) and temperatures (175-520° C.) to be realised during testing. NOx and NH3 concentrations were 300+/−20 ppm and 300+/−30 ppm, respectively; in all other aspects the exhaust spider and heat exchanger configuration were as previously stated. The data obtained shows several key features:

i) The OS containing technologies provide effective NOx conversion over a wide range of temperatures and flow rates both with and without the requirement of a pre-DOC.

ii) The DOC promotes NOx conversions: This effect is especially pronounced at lower temperatures and higher flow rates when comparing with and without DOC results.

iii) There is a complex interaction between flow rate and temperature with the pre DOC. Hence use of higher flow rates at 400° C. shows a negative correlation with NOx conversion for all technologies. However at 300 and 350° C., the conversions at 22 and 33 g/s are similar but in these instances conversion is seen to decrease significantly at 44 g/s.

iv) In the absence of the DOC there is a direct negative correlation between increasing flow rate and conversion at 300, 350 and 400° C. (R2 calculations>0.95 in all cases). However there is insufficient data to unambiguously rank the robustness of the technologies versus flow rate but it should be stressed that in this temperature region the OS9 technology offers the highest NOx conversion, at all flow rates.

Table 6 illustrates the Effect of MHSV and DOC on Engine Dyno Performance of W-promoted OS materials after 50 h dyno aging at 660° C.

TABLE 6

Effect of MHSV and DOC on Dyno Performance of W-promoted OS materials ex 50 h dyno aging at 660° C.

| | 10W-OS17 | 10W-OS8 | 10W-OS18 | 10W-OS19 |
|---|---|---|---|---|
| | | 22 g/s with DOC | | |
| 175 | 14 | 20.9 | 16.8 | 11.3 |
| 200 | 31.3 | 43 | 23.6 | 21.8 |
| 250 | 79 | 88.6 | 61.6 | 59.7 |
| 300 | 92.3 | 95.4 | 92.6 | 98 |
| 350 | 96.4 | 95.9 | 92.3 | 93.6 |
| 400 | 93.2 | 90.9 | 82.7 | 82.6 |
| | | 22 g/s no DOC | | |
| 175 | 24.2 | 20.4 | 22 | 20.3 |
| 200 | 26.7 | 26.1 | 24.9 | 22.6 |
| 250 | 36.2 | 40.3 | 32.5 | 31.2 |
| 300 | 54.9 | 64 | 54.2 | 48.9 |

TABLE 6-continued

Effect of MHSV and DOC on Dyno Performance of W-promoted OS materials ex 50 h dyno aging at 660° C.

| | 10W-OS17 | 10W-OS8 | 10W-OS18 | 10W-OS19 |
|---|---|---|---|---|
| 350 | 74.2 | 77.4 | 72.6 | 71.7 |
| 400 | 85.6 | 82.3 | 85 | 84 |
| | | 44 g/s with DOC | | |
| 300 | 70.6 | 60.1 | 46.3 | 47.9 |
| 350 | 87.1 | 85.6 | 76.4 | 76.2 |
| 400 | 76.5 | 76.4 | 68.6 | 69.2 |
| 450 | 70.3 | 73.5 | 66.9 | 67 |
| 500 | 69.7 | 72.3 | 70.2 | 71.4 |
| | | 44 g/s no DOC | | |
| 300 | 33.7 | 37.5 | 26.5 | 29.7 |
| 350 | 47 | 49.1 | 39.6 | 42.8 |
| 400 | 59.7 | 60.7 | 52.9 | 56.4 |
| 450 | 68.3 | 67.8 | 61.3 | 67.1 |
| 500 | 73.8 | 71.8 | 67.8 | 69.6 |

Table 6 summarises the impact of MHSV and DOC for OS based technologies, further promoted by the post-impregnation of Tungsten. Herein 10% W-OS8 is included as reference. This enables comparison of redox-acid OS versus Alkaline Earth doped OS. The performance of the aged technologies is good and follows 10W-OS8≧10W-OS17≧10W-OS18=10W-0519. Clearly an additional benefit may be realised by the addition of Tungsten to the lattice-doped cubic OS. Further analysis reflects the trends observed in Table 5 i.e. positive impact of DOC and negative impact of high flow rates. Moreover the data indicate that in this instance the activity of the catalyst may be influenced by manipulation of the type and concentration of Rare Earth dopants in the cubic lattice, with the combination of $Y_2O_3$+$La_2O_3$+$Pr_6O_{11}$ providing the overall best performance for the SrO-doped OS samples. Again however none of the technologies exhibit catastrophic loss in performance under a wide range of conditions, in the presence of various poisons such as CO, HC, SOx and the like, in the exhaust stream (especially in DOC free tests) confirming the technologies to be competitive and appropriate for vehicular applications.

TABLE 7

Effect of Tungsten promotion, MHSV and DOC on Dyno Performance of W-promoted, dual OS materials ex 50 h dyno aging at 660° C.

| | 10W-OS8 | 10W-OS8-OS16 | 10W-OS16-OS8 | OS8 |
|---|---|---|---|---|
| | | 22 g/s with DOC | | |
| 175 | 16.5 | 26.3 | 18.4 | 8.5 |
| 200 | 35.7 | 36.3 | 26.8 | 25.8 |
| 250 | 81.3 | 76.6 | 63.9 | 61.9 |
| 300 | 89.1 | 83.1 | 87.5 | 95.7 |
| 350 | 95.3 | 95.5 | 91.4 | 95.8 |
| 400 | 91.2 | 91.2 | 87.5 | 94.9 |
| | | 22 g/s no DOC | | |
| 175 | 21.2 | 24.5 | 20.1 | 14.4 |
| 200 | 24.6 | 27.8 | 22.4 | 18.9 |
| 250 | 36.9 | 38.5 | 32.5 | 25.9 |
| 300 | 55.5 | 57.2 | 53.5 | 43.0 |
| 350 | 75.1 | 76.3 | 74.2 | 76.7 |
| 400 | 85.9 | 88.5 | 84.9 | 93.5 |
| | | 44 g/s with DOC | | |
| 300 | 61.6 | 73.3 | 45.6 | 48.2 |
| 350 | 79.1 | 90.5 | 73 | 74.9 |
| 400 | 74.7 | 80.2 | 69.2 | 77.7 |
| 450 | 72.3 | 72.9 | 68.7 | 82.9 |
| 500 | 74.1 | 72.1 | 71.3 | 87.4 |
| | | 44 g/s no DOC | | |
| 300 | 36.2 | 37.3 | 36.9 | 26.5 |
| 350 | 51.5 | 49.8 | 47.1 | 42.7 |
| 400 | 63.1 | 63.2 | 60.6 | 64.4 |
| 450 | 68.1 | 69.0 | 68.7 | 78.0 |
| 500 | 71.2 | 72.9 | 70.9 | 86.8 |

Table 7 is a further summary of W-promoted OS technologies but herein the effect of combining a lattice doped OS with 'conventional' OS materials is examined. The aim was to increase the redox character of the washcoat by utilising a standard OS from a three way catalyst (U.S. Pat. No. 6,387,338) known for its facile 0 ion conducting characteristic and high hydrothermal durability. The data show high performance for all technologies, again under a diverse range of conditions. It is also apparent that while the Tungsten promotion provides improved low temperature performance the un-promoted OS8 material offers superior high temperature activity. Both of these features are attributed to the ability of the catalyst to activate $NH_3$, at lower temperatures this is beneficial as the activation of $NH_3$ may play a role in the rate determining step of the process, but at high temperatures a high ability to activate $NH_3$ results in increased rates of parasitic $NH_3$ oxidation. With respect to the concentration of dual OS present in the washcoat the data suggest high levels of cation-doped OS are preferred with higher loadings of non-cation doped OS resulting in decreased performance. Again the data show the positive role of the DOC, notwithstanding the fact that the OS materials still retain fair NOx conversion even in the absence of the OS—particularly for T≧400° C. where activities are nearly identical. Similarly high flow rates are again correlated with decreased activity, although again at higher temperatures the differences become increasingly small, especially for the OS8 technology.

It should be further noted that the terms "first", "second" and the like herein do not denote any order of importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired" is inclusive of the endpoints and all intermediate values of the ranges, e.g. "about 5 wt. % to about 25 wt. %, about 5 wt. % to about 15 wt. %" etc.

In one embodiment, a catalytic device can comprise a housing disposed around a substrate with an SCR catalyst disposed at the substrate. Also, the method for treating the off-gas of a gasoline lean burn or compression ignition exhaust or lean fossil fuel combustion exhaust stream can comprise: introducing the said exhaust stream to an SCR catalyst; and reducing to $N_2$ the NOx component of said exhaust stream.

The catalyst materials are included in the formulation by combining alumina, or other appropriate support, with other catalyst materials to form a mixture, drying (actively or passively), and optionally calcining. More specifically, a slurry can be formed by combining alumina and water, and optionally pH control agents (such as inorganic or organic acids and bases) and/or other components. The catalytic OS materials can then be added. This slurry can then be washcoated onto a suitable substrate. The washcoated product can be dried and heat treated to fix the washcoat onto the substrate.

This slurry can be dried and heat treated, e.g., at temperatures of about 500° C. to about 1,000° C., or more specifically about 500° C. to about 700° C., to form the finished catalyst formulation. Alternatively, or in addition, the slurry can be washcoated onto the substrate and then heat treated as described above, to adjust the surface area and crystalline nature of the support. Once the support has been heat treated, catalyst metals may optionally be disposed on the support. The catalyst metals, therefore, can be added after the washcoat is fixed onto the substrate by additional washcoat steps and/or by exposing the washcoated substrate to a liquid containing the catalytic metal.

The catalyst comprises a phase pure lattice oxide material based upon $ZrOx$, $CeZrOx$, $CeZrYOx$, $CeZrREOx$ (where RE=Rare Earth Metal) or $CeZrYREOx$ or mixtures thereof as active catalysts for the SCR of NOx using a N-bearing reductant. The lattice oxide material(s) is/are further characterised by the presence of catalytically active cations dispersed within the lattice structure such that conventional XRD analysis reveals a phase pure material. The catalyst may additionally comprise an inert refractory binder selected from the group consisting of alumina, titania, non-Zeolitic silica-alumina, silica, zirconia, composites thereof or mixtures comprising at least 2 thereof. Finally the catalyst may additionally contain ($35 \leq$ wt %) Zeolite/Zeotype or metal exchanged Zeolite/Zeotype material selected from one or a mixture of more than one selected from the group ZSM5, Zeolite O, Chabazite, SAPO-34 or other Zeolite characterised by a structure containing an 8-ring pore opening structure. The metal employed in the metal exchanged Zeolite/Zeotype is selected from one or a mixture of Copper and Iron.

The supported catalyst can be disposed on a substrate. The substrate can comprise any material designed for use in the desired environment, e.g., a compression ignition/diesel engine environment. Possible materials include cordierite, silicon carbide, metal, metal oxides (e.g., alumina, and the like), glasses, and the like, and mixtures comprising at least one of the foregoing materials. These materials can be in the form of packing material, extrudates, foils, perform, mat, fibrous material, monoliths (e.g., a honeycomb structure, and the like), wall-flow monoliths (with capability for diesel particulate filtration), other porous structures (e.g., porous glasses, sponges), foams, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale. Alternatively the cation-doped lattice material may be extruded, with appropriate binders and fibres, into a monolith or wall-flow monolithic structure.

Although the substrate can have any size or geometry, the size and geometry are preferably chosen to optimise geometric area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the converter. The housing can have any design and comprise any material suitable for application. Suitable materials can comprise metals, alloys, and the like, such as ferritic stainless steels (including stainless steels e.g. 400-Series such as SS-409, SS-439, and SS-441), and other alloys (e.g. those containing nickel, chromium, aluminium, yttrium and the like, to permit increased stability and/or corrosion resistance at operating temperatures or under oxidising or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., moulded or the like), or can be formed integrally with the housing methods such as, e.g., a spin forming, or the like.

Disposed between the housing and the substrate can be a retention material. The retention material, which may be in the form of a mat, particulates, or the like, may be an intumescent material e.g., a material that comprises vermiculite component, i.e., a component that expands upon the application of heat, a non-intumescent material, or a combination thereof. These materials may comprise ceramic materials e.g., ceramic fibres and other materials such as organic and inorganic binders and the like, or combinations comprising at least one of the foregoing materials.

Thus, the coated monolith with OS-containing catalyst is incorporated into the exhaust flow of the fuel lean engine. This provides a means for treating said exhaust stream to reduce the concentrations of NOx by passing said diesel exhaust stream over the aforementioned SCR catalyst under net oxidising conditions (oxygen rich), in the presence of in-exhaust injected Urea or Ammonia, or HC to facilitate catalytic conversion into environmentally benign Nitrogen gas.

The above-described catalyst and process and other features will be appreciated and understood by those skilled in the art from the following detailed description, drawings, and appended claims.

EXAMPLES

The synthesis method of the OS4 material followed the method of Bortun and Nunan (U.S. Pat. No. 6,605,264) relied on and incorporated herein by reference. Herein, the required concentrations of Zr ($ZrO(NO_3)_2$ solution), Ce (ex $Ce(NO_3)_3 \cdot H_2O$) and Y ($Y(NO_3)_3 \cdot 6H_2O$) are dissolved in deionised (D.I.) water with constant stirring to form a homogeneous solution. Next a mixture of Nb (ex $NbCl_5$) in aqueous HCl, to which small quantities of $H_2O_2$ are added (to maintain $Nb^{5+}$ in solution) was prepared. This mixture was then added slowly, and with vigorous mixing, to the other aqueous precursors. The final mixture was then added to 3M $NH_4OH$, again with vigorous mixing, to form a precipitated suspension. The suspension was mixed for 3 hours and then filtered and repeatedly washed to remove any residual $NH_4Cl$ and $NH_4NO_3$, prior to drying at 120° C. for 24 h and calcination at 700° C. for 2 hours.

The synthesis of OS7 followed U.S. application Ser. No. 12/363,310 which is relied on and incorporated herein by reference. Herein the required mass of copper (II) nitrate trihydrate is dissolved in minimal D.I. water. To this solution 30 wt % $NH_4OH$ was added until a blue-black copper tetra-ammoniacal solution was obtained. The copper tetramine was then added to OS2 (dry basis), with mixing until a homogeneous powder was obtained. The powder was dried and calcined at 540° C. for 4 hours.

The procedure for making Parts OS1, OS2 and OS3, is as follows: Slowly add Alumina to deionised (D.I.) water, containing any required slurry viscosity/rheology modifiers, with milling over ca. 15 minutes. Mill the slurry to a $d_{50}$ (diameter of 50% of the particles) of 5-7 microns, confirm $d_{90}$. Next slowly add appropriate OS powder, correct for loss on ignition (LOI), to minimal additional D.I. water to produce a slurry of appropriate viscosity and rheology for coating. Confirm $D_{50}$ and $D_{90}$ of OS slurry. Add OS slurry to Alumina slurry and mix for a minimum of 30 minutes. Lightly mill combined slurry to homogenise and check particle size of components. Target $d_{50}$ of 3-6 microns for combined slurry, and re-confirm $d_{90}$. Check specific gravity and pH and adjust to facilitate coating in one pass. Then coat monolith in 1 pass and calcine at temperatures $\geq 540°$ C. for $\geq 1$ hour.

The procedure for making Parts OS4, OS5 and OS6, is as follows: Slowly add the Alumina to a 0.5% $HNO_3$/D.I. water solution, add any other required slurry viscosity/rheology modifiers. Target a slurry of 50% solids with a final pH of 3.5-4, adjust pH if necessary. Next mill the slurry to a $d_{50}$ of 4-5 microns, and $d_{90}$ of 14-16 microns. After milling the pH should be 4-4.5, adjust if required. Next slowly add appropriate OS powder, correct for LOI, and additional D.I. water (at 50% mass of OS) to the alumina slurry. Then mill in a vibratory mill to a $d_{50}$ of 3-4 microns. In any case milling must not exceed 10 minutes. Check specific gravity and pH of slurry and adjust to facilitate coating in one pass. Then coat monolith in 1 pass and calcine at temperatures $\geq 540°$ C. for $\geq 1$ hour.

The procedure for making Part OS7-FeZEO 1: Slowly add Alumina to D.I. water, containing any required slurry modifiers, with milling over ca. 15 minutes. Mill the slurry to a $d_{50}$ of 7-10 microns, confirm $d_{90}$. Next slowly add 3% Fe-MFI27 powder, correct for LOI, with additional D.I. water (1:1 by mass to Zeolite) to produce a slurry of appropriate viscosity and rheology for coating. Mill slurry to a $d_{50}$ of 5-8 microns. Next slowly add OS7 powder, correct for LOI, to minimal D.I. water to produce a slurry of appropriate viscosity and rheology for coating. Mill to a $d_{50}$ of 4-6 microns, confirm $D_{90}$. Add OS slurry to Alumina-Zeolite slurry and mix for a minimum of 30 minutes. Lightly mill combined slurry to homogenise particle size. Target $d_{50}$ of 3-6 microns, and re-confirm $d_{90}$. Check specific gravity and pH of slurry and adjust to facilitate coating in one pass. Then coat monolith in 1 pass and calcine at temperatures $\geq 540°$ C. for $\geq 1$ hour.

The procedure for making Part OS7-FeZEO 2 is as follows: Slowly add Alumina to D.I. water, containing any required slurry modifiers, with milling over ca. 15 minutes. Mill the slurry to a d50 of 7-10 microns, confirm d90. Adjust pH to facilitate 1 pass coating, coat monolith and calcine at >540° C. for >1 hour. Next add 3% Fe-MFI27 powder, correct for LOI, to D.I. water (target 1:1 by mass to Zeolite) to produce a slurry of appropriate viscosity and rheology for coating. Mill resultant slurry to a d50 of 5-8 microns. Next slowly add OS7 powder, correct for LOI, to minimal D.I. water to produce a slurry of appropriate viscosity and rheology. Mill to a d50 of 4-6 microns, confirm D90. Add OS slurry to Zeolite slurry and mix for 30 minutes. Lightly mill combined slurry to homogenise particle size of components. Target d50 of 3-6 microns for combined slurry, and re-confirm d90. Check specific gravity and pH of slurry and adjust to facilitate coating in one pass. Then coat monolith in 1 pass and calcine at >540° C. for >1 hour.

The procedure for making Part OS7: Slowly add Alumina to D.I. water, containing any required slurry viscosity modifiers, with milling over ca. 15 minutes. Mill the slurry to a d50 of 7-10 microns, confirm d90. Adjust pH to facilitate 1 pass coating, coat monolith and calcine at >540° C. for >1 hour. Next slowly add OS7 powder, correct for LOI, to minimal D.I. water to produce a slurry of appropriate viscosity and rheology. Mill to a d50 of 4-6 microns, confirm D90. Add OS slurry to Zeolite slurry and mix for at least 30 minutes. Lightly mill combined slurry to homogenise particle size of components. Target d50 of 3-6 microns, and re-confirm d90. Check specific gravity and pH and adjust to facilitate coating in one pass. Coat monolith in 1 pass and calcine at >540° C. for >1 hour.

The procedure for making Parts OS8, OS9 and OS10 is as follows: Slowly add Alumina to D.I. water, containing any required slurry viscosity/rheology modifiers, with milling over ca. 15 minutes. Mill the slurry to a d50 of 7-10 microns, confirm d90. Adjust pH to facilitate 1 pass coating, coat monolith and calcine at >540° C. for >1 hour. Next slowly add appropriate OS powder, correct for LOI, to minimal D.I. water with any required modifiers to produce a slurry of appropriate viscosity and rheology. Mill in a vibratory mill to a d50 of 4-6 microns, confirm D90. Target d50 of 3-6 microns for combined slurry, and confirm d90. Check specific gravity and pH of slurry and adjust to facilitate coating in one pass. Coat monolith in 1 pass and calcine at >540° C. for >1 hour.

The procedure for making Parts OS11a, OS11b and OS12 is as follows: Slowly add Lanthanum-stabilised Alumina to D.I. water, containing any required slurry viscosity/rheology modifiers, with mixing over ca. 15 minutes. Mill to a d50 of 5-6 microns, confirm d90, taking care to ensure slurry does not exceed 25° C. Adjust pH to facilitate 1 pass coating, coat monolith and calcine at >540° C. for >1 hour. Next slowly add appropriate OS powder, correct for LOI, to minimal D.I. water and any required modifiers to produce a slurry of appropriate viscosity and rheology. Mill to a d50 of 4-6 microns, confirm D90. Check specific gravity and pH of slurry and adjust to facilitate coating in one pass. Then coat monolith in 1 pass and calcine at >540° C. for >1 hour.

The procedure for making Part OS12+ZSM5 is as follows: Slowly add Lanthanum-stabilised Alumina to D.I. water, containing any required slurry viscosity/rheology modifiers, with mixing over ca. 15 minutes. Mill the slurry to a d50 of 5-6 microns, confirm d90. Take care to ensure slurry does not exceed 25° C. Confirm specific gravity and pH and adjust to facilitate 1 pass coating, coat monolith and calcine at >540° C. for >1 hour. Next slowly add OS12 powder and then MFI40 powder, both correct for LOI, to minimal D.I. water with any required modifiers to produce a slurry of appropriate viscosity and rheology. Mill to a d50 of 4-6 microns, confirm D90. Check specific gravity and pH of slurry and adjust to facilitate coating in one pass. Then coat monolith in 1 pass and calcine at >540° C. for >1 hour.

The procedure for making Part OS12+ZSM5+Cu is as follows: Slowly add Lanthanum-stabilised Alumina to D.I. water, containing any required slurry viscosity/rheology modifiers, with mixing over ca. 15 minutes. Mill the slurry to a d50 of 5-6 microns, confirm d90. Take care to ensure slurry does not exceed 25° C. Confirm specific gravity and pH and adjust to facilitate 1 pass coating, coat monolith and calcine at >540° C. for >1 hour. Next slowly add OS12 powder and then MFI40 powder, both correct for LOI, to minimal D.I. water with any required modifiers to produce a slurry of appropriate viscosity and rheology for coating. Mill to a d50 of 4-6 microns, confirm D90. Check specific gravity and pH of slurry and adjust to facilitate coating in one pass. Coat monolith in 1 pass and calcine at >540° C. for >1 hour. Next determine moisture uptake of dried part. Using this value prepare an aqueous solution of Cu(NH$_3$OH)$_4$, pH should be 9-10, and post-impregnate part, dry and calcine at >540° C. for >1 hour.

The procedure for making Part OS12+Cu: Slowly add Lanthanum-stabilised Alumina to D.I. water containing any required slurry viscosity modifiers, with mixing over ca. 15 minutes. Mill the slurry to a d50 of 5-6 microns, confirm d90. Take care to ensure slurry does not exceed 25° C. Confirm specific gravity and pH and adjust to facilitate 1 pass coating, coat monolith and calcine at >540° C. for >1 hour. Next slowly add OS12 powder, correct for LOI, to minimal D.I. water with any required modifiers to produce a slurry of appropriate viscosity and rheology for coating. Mill to a d50 of 4-6 microns, confirm D90. Check specific gravity and pH and adjust to facilitate coating in one pass. Coat monolith in 1 pass and calcine at >540° C. for >1 hour. Next determine moisture uptake or dried part. Using this value prepare an aqueous solution of Cu(NH$_3$OH)$_4$, pH should be 9-10, and post-impregnate part, dry and calcine at >540° C. for >1 hour.

The procedure for making Part OS8+Cu-ZSM5 is as follows: Slowly add the Alumina to a 0.5% HNO$_3$/D.I. water solution, add any other required slurry viscosity/rheology modifiers. Target a slurry of 50% solids with a final pH of 3.5-4, adjust final pH if necessary. Next mill the slurry to a d50 of 4-5 microns, and d90 of <9 microns. Allow slurry to age for 24 hours to stabilise. Next slowly add OS8 and 5% Cu-ZSM5 powders, both correct for LOI, to minimal D.I. water with any required modifiers to produce a slurry of appropriate viscosity and rheology. Mill to a d50 of 4-6 microns, confirm D90. During milling maintain close to pH 6 and adjust with judicious use of organic base if pH goes below 3.5. Add OS8-CuZSM5 slurry to alumina slurry and mix for a minimum of 30 minutes. Check specific gravity and pH of slurry and adjust to facilitate coating in one pass. Then coat monolith in 1 pass and calcine at >540° C. for >1 hour.

The procedure for making Parts OS13, OS14 and OS15 is as follows: Slowly add Alumina to D.I. water, containing any required slurry viscosity/rheology modifiers, with milling over ca. 15 minutes. Mill the slurry to a d50 of 7-10 microns, confirm d90. Adjust pH to facilitate 1 pass coating, coat monolith and calcine at >540° C. for >1 hour. Next slowly add appropriate OS powder, correct for LOI, to minimal D.I. water to produce a slurry of appropriate viscosity and rheology for coating. Mill to a d50 of 4-6 microns, confirm D90. Check specific gravity and pH of slurry and adjust to facilitate coating in one pass. Then coat monolith in 1 pass and calcine at >540° C. for >1 hour.

The procedure for making Part 10W—OS8 is as follows: Slowly add the Alumina to a 0.4% HNO$_3$/D.I. water solution, add any other required slurry viscosity/rheology modifiers. Target a slurry of 50% solids with a final pH of 3.5-4, adjust final pH if necessary. Next mill the slurry to a d50 of 4-5 microns, and d90 of <9 microns. Allow slurry to age for 24 hours to stabilise. Next slowly add OS8 powder, correct for LOI, to minimal D.I. water and any required modifiers to produce a slurry of appropriate viscosity and rheology for coating. Mill to a d50 of 4-6 microns, confirm D90. Dissolve ammonium metatungstate [(NH$_4$)$_6$H$_2$W$_{12}$O$_{40}$.xH$_2$O] salt in minimal D.I. water with constant stirring to provide appropriate loading of Tungsten, mix for at least 15 minutes. Add Tungsten solution to OS8 slurry and mix for a minimum of 60 minutes to allow full chemisorption of Tungsten. Add alumina slurry to OS8-W slurry and mix for 30 minutes. Check specific gravity and pH of slurry and adjust to facilitate coating in one pass. Then coat monolith in 1 pass and calcine at >540° C. for >1 hour.

The procedure for making Parts 10W-OS8-OS16 and 10W-OS16-OS8 is as follows: Slowly add Alumina to a 0.4% HNO$_3$/D.I. water solution, add any other required slurry viscosity/rheology modifiers. Target a slurry of 50% solids with a final pH of 3.5-4, adjust final pH if necessary. Mill the slurry to a d50 of 4-5 microns, and d90 of <9 microns. Allow slurry to age for 24 hours to stabilise. Next slowly add required OS8 and OS16 powders, correct for LOI, to minimal D.I. water and any required modifiers to produce a slurry of appropriate viscosity and rheology for coating. Mill to a d50 of 4-6 microns, confirm D90. Dissolve ammonium metatungstate [(NH$_4$)$_6$H$_2$W$_{12}$O$_{40}$.xH$_2$O] salt in minimal D.I. water with constant stirring to provide appropriate loading of Tungsten, mix for at least 15 minutes. Add Tungsten solution to OS8 slurry and mix for a minimum of 60 minutes to allow full chemisorption of Tungsten. Add alumina slurry to OS8-W slurry and mix for 30 minutes. Check specific gravity and pH of slurry and adjust to facilitate coating in one pass. Then coat monolith in 1 pass and calcine at >540° C. for >1 hour.

The procedure for making Parts 10W-OS17, 10W-OS18 and 10W-OS19 is as follows: Slowly add the Alumina to a 0.4% HNO$_3$/D.I. water solution, add any other required slurry viscosity/rheology modifiers. Target a slurry of 50% solids with a final pH of 3.5-4, adjust final pH if necessary. Next mill the slurry to a d50 of 4-5 microns, and d90 of <9 microns. Allow slurry to age for 24 hours to stabilise. Next slowly add appropriate OS powder, correct for LOI, to minimal D.I. water and any required modifiers to produce a slurry of appropriate viscosity and rheology for coating. Mill to a d50 of 4-6 microns, confirm D90. Dissolve ammonium metatungstate salt in minimal D.I. water with constant stirring to provide appropriate loading of Tungsten, mix for at least 15 minutes. Add Tungsten solution to OS8 slurry and mix for a minimum of 60 minutes to allow full chemisorption of Tungsten. Add alumina slurry to OS8-W slurry and mix for 30 minutes. Check specific gravity and pH of slurry and adjust to facilitate coating in one pass. Then coat monolith in 1 pass and calcine at >540° C. for >1 hour.

List of OS compositions employed:
OS1 CeO$_2$ 31.99 ZrO$_2$ 50.9 La$_2$O$_3$ 4.9 Y$_2$O$_3$ 4.88 Fe$_2$O$_3$ 7.33
OS2 CeO$_2$ 44.75 ZrO$_2$ 36.28 Nd$_2$O$_3$ 9.87 Pr$_6$O$_{11}$ 4.48 Nb$_2$O$_5$ 4.62
OS3 CeO$_2$ 44.72 ZrO$_2$ 35.33 Nd$_2$O$_3$ 9.68 Pr$_6$O$_{11}$ 4.59 Nb$_2$O$_5$ 4.72 Fe$_2$O$_3$ 0.96
OS4 CeO$_2$ 31.76 ZrO$_2$ 54.79 Y$_2$O$_3$ 6.44 Nb$_2$O$_5$ 7.01
OS5 CeO$_2$ 44.33 ZrO$_2$ 38.06 La$_2$O$_3$ 9.77 Pr$_6$O$_{11}$ 4.66 Fe$_2$O$_3$ 3.18
OS6 CeO$_2$ 44.4 ZrO$_2$ 35.36 La$_2$O$_3$ 9.77 Pr$_6$O$_{11}$ 4.74 Nb$_2$O$_5$ 4.58 Fe$_2$O$_3$ 1.15
OS7 CeO$_2$ 38.75 ZrO$_2$ 47.7 La$_2$O$_3$ 4.82 Pr$_6$O$_{11}$ 4.72 CuO 4
OS8 CeO$_2$ 32.07 ZrO$_2$ 54.1 Y$_2$O$_3$ 6.39 Nb$_2$O$_5$ 7.44
OS9 CeO$_2$ 36.07 ZrO$_2$ 54.19 Y$_2$O$_3$ 4.87 Nb$_2$O$_5$ 4.87
OS10 CeO$_2$ 32.26 ZrO$_2$ 51.95 La$_2$O$_3$ 2.05 Y$_2$O$_3$ 6.29 Nb$_2$O$_5$ 7.45
OS11 CeO$_2$ 44 ZrO$_2$ 39.5 La$_2$O$_3$ 9.5 Pr$_6$O$_{11}$ 4.5 CaO 2.5
OS12 CeO$_2$ 31.5 ZrO$_2$ 52.3 La$_2$O$_3$ 5 Y$_2$O$_3$ 5 SrO 5
OS13 CeO$_2$ 30.22 ZrO$_2$ 52.16 Y$_2$O$_3$ 7.84 Pr$_6$O$_{11}$ 2.05 Nb$_2$O$_5$ 7.73
OS14 CeO$_2$ 30 ZrO$_2$ 48.4 Y$_2$O$_3$ 9.85 Pr$_6$O$_{11}$ 2.02 Nb$_2$O$_5$ 9.73
OS15 CeO$_2$ 30.14 ZrO$_2$ 54.16 Y$_2$O$_3$ 7.85 Nb$_2$O$_5$ 7.85
OS16 CeO$_2$ 31.5 ZrO$_2$ 58.6 La$_2$O$_3$ 4.9 Y$_2$O$_3$ 5
OS17 CeO$_2$ 31 ZrO$_2$ 57 Y$_2$O$_3$ 5 La$_2$O$_3$ 3 Pr$_6$O$_{11}$ 3 SrO 1

OS18 CeO$_2$ 31 ZrO$_2$ 58 Y$_2$O$_3$ 5 La$_2$O$_3$ 5 SrO 1
OS19 CeO$_2$ 31 ZrO$_2$ 58 Y$_2$O$_3$ 5 Pr$_6$O$_{11}$ 5 SrO 1

Washcoat definitions in g/in$^3$, the commercial reference catalysts used in these studies are all based upon 5% Cu-MFI40.

FIG. 4:
0.5 Al$_2$O$_3$ 1 3% Fe-MFI(27) 2 OS7
1.1 Al$_2$O$_3$ 0.5 3% Fe-MFI(27) 2 OS7
1.1 Al$_2$O$_3$ 2.5 OS7

FIG. 5:
1.1 Al$_2$O$_3$ pass 1|2.5 OS8 pass 2
1.1 Al$_2$O$_3$ pass 1|2.5 OS9 pass 2
1.1 Al$_2$O$_3$ pass 1|2.5 OS10 pass 2

FIG. 6:
1.1 4% La$_2$O$_3$—Al$_2$O$_3$ pass 1|2.5 OS11 pass 2
1.5 4% La$_2$O$_3$—Al$_2$O$_3$ pass 1|2.5 OS11 pass 2
1.5 4% La$_2$O$_3$—Al$_2$O$_3$ pass 1|2.5 OS12 pass 2

Figure 7:
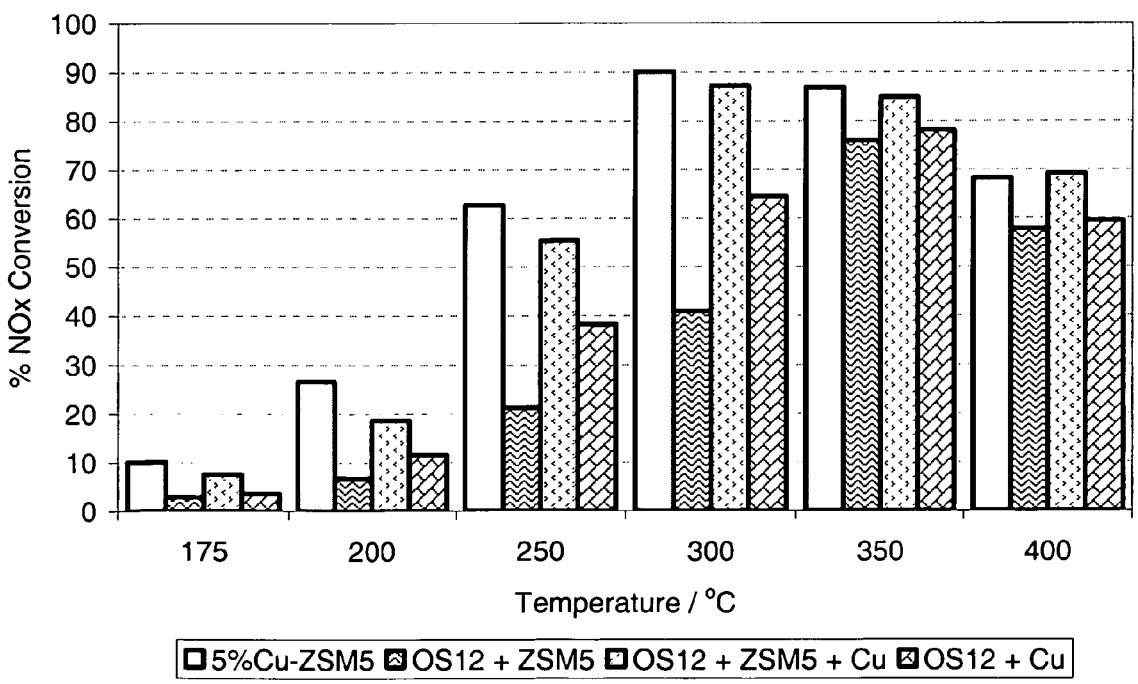
FIG. 7—Dyno Performance of OS materials vs Zeolite SCR ex 50 h/660° C. dyno aging. The Engine Dyno Performance of OS12 variants is depicted vs commercial SCR reference after 50 h dyno aging at 660° C. Performance is with pre DOC.

FIG. 7:
1.5 4% La$_2$O$_3$—Al$_2$O$_3$ pass 1|0.5 MFI(40) 2 OS12 pass 2
1.5 4% La$_2$O$_3$—Al$_2$O$_3$ pass 1|0.5 MFI(40) 2 OS12 pass 2|0.225 Cu(NH$_3$OH)$_4$
1.5 4% La$_2$O$_3$—Al$_2$O$_3$ pass 1|2.5 OS12 pass 2|0.225 Cu(NH$_3$OH)$_4$ FIG. 8:
1.1 Al$_2$O$_3$ pass 1|2.5 OS14 pass 2
1.1 Al$_2$O$_3$ pass 1|2.5 OS13 pass 2
1.1 Al$_2$O$_3$ pass 1|2.5 OS15 pass 2

FIG. 9: SGB Analysis of Transient SCR Response at a) 300° C. and b) 400° C.
0.5 Al$_2$O$_3$ 1.5 5% CuMFI(40) 1.5 OS8

FIG. 10: SGB Analysis of NH$_3$ 'Plume' Formation during Temperature ramp.
0.5 Al$_2$O$_3$ 1.5 5% CuMFI(40) 1.5 OS8

Table 1: Engine Dyno Test Details
Table 2: XRD Phase Analysis of OS4, OS5 and OS6
Table 3: XRD Phase Analysis of OS11 and OS12
Table 4: SGB Analysis
1.1 Al$_2$O$_3$ pass 1|2.5 OS9 pass 2
0.5 Al$_2$O$_3$ 1.5 5% CuMFI(40) 1.5 OS8

Table 5: Effect of MHSV and presence of DOC (w) on Engine Dyno Performance of OS materials vs commercial SCR reference after 50 h dyno aging at 660° C.
1.1 Al$_2$O$_3$ pass 1|2.5 OS9 pass 2
0.5 Al$_2$O$_3$ 1.5 5% CuMFI(40) 1.5 OS8

Table 6: Effect of MHSV and presence of DOC on Engine Dyno Performance of W-promoted OS materials after 50 h dyno aging at 660° C.
0.35 Al$_2$O$_3$ 0.2889W 2.6OS8
0.35 Al$_2$O$_3$ 0.2889W1.7334OS8 0.8666OS16
0.35 Al$_2$O$_3$ 0.2889W1.7334OS16 0.8666OS8
1.1 Al$_2$O$_3$ pass 1|2.5 OS8 pass 2

Table 7: Effect of Tungsten promotion, MHSV and presence of DOC on Engine Dyno Performance of W-promoted, dual OS materials after 50 h dyno aging at 660° C.
0.35 Al$_2$O$_3$ 0.2889W 2.6OS17
0.35 Al$_2$O$_3$ 0.2889W 2.6OS8
0.35 Al$_2$O$_3$ 0.2889W 2.6OS18
0.35 Al$_2$O$_3$ 0.2889W 2.6OS19

While the invention has been described above with reference to exemplary embodiments, it will be understood by those skilled in the art that various changes may be made and equivalents may be substituted for elements thereof without departing from the scope and the general principle of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

These embodiments may in particular encompass the following aspects: A method for the conversion of the oxides of nitrogen to nitrogen by contacting said nitrogen oxides with a nitrogen-containing reductant in the presence of a base metal oxide catalyst comprising:
(a) a phase pure crystal lattice structure, and
(b) catalytically active cations dispersed within said lattice structure A method of the invention for the conversion of the oxides of nitrogen to nitrogen by contacting said nitrogen oxides with a nitrogen-containing reductant, wherein the phase pure lattice structure is derived from the oxides of zirconium.

A method of the invention for the conversion of the oxides of nitrogen to nitrogen by contacting said nitrogen oxides with a nitrogen-containing reductant, wherein the phase pure lattice structure is derived from the oxides of cerium-zirconium solid solution.

A method of the invention for the conversion of the oxides of nitrogen to nitrogen by contacting said nitrogen oxides with a nitrogen-containing reductant, wherein the phase pure lattice structure is derived from the oxides of cerium-zirconium-yttrium solid solution.

A method of the invention for the conversion of the oxides of nitrogen to nitrogen by contacting said nitrogen oxides with a nitrogen-containing reductant, wherein the phase pure lattice structure is derived from the oxides of cerium-zirconium-rare earth, wherein rare earth means the 30 elements composed of the lanthanide and actinide series of the Periodic Table of Elements.

A method of the invention for the conversion of the oxides of nitrogen to nitrogen by contacting said nitrogen oxides with a nitrogen-containing reductant, wherein the phase pure lattice structure is derived from the oxides of cerium-zirconium-yttrium-rare earth, wherein rare earth means the 30 elements composed of the lanthanide and actinide series of the Periodic Table of Elements.

A method of the invention for the conversion of the oxides of nitrogen to nitrogen by contacting said nitrogen oxides with a nitrogen-containing reductant, wherein the catalyst contains cation doped lattice structures wherein the doped lattice structures comprise a mixture of at least 2 lattice structures selected from the group consisting of oxides of zirconium, oxides of cerium-zirconium solid solution, cerium-zirconium-yttrium solid solution, oxides of cerium-zirconium-rare earth and oxides of cerium-zirconium-yttrium-rare earth, wherein rare earth means the 30 elements composed of the lanthanide and actinide series of the Periodic Table of Elements.

A method of the invention for the conversion of the oxides of nitrogen to nitrogen by contacting said nitrogen oxides with a nitrogen-containing reductant, wherein the active dispersed cations are selected from 1 or more elements of the transition metal series of the Periodic Table of Elements.

A method of the invention for the conversion of the oxides of nitrogen to nitrogen by contacting said nitrogen oxides with a nitrogen-containing reductant, wherein the active dispersed cations are selected from 1 or more elements of the alkaline earth metal group of the Periodic Table of Elements.

A method of the invention for the conversion of the oxides of nitrogen to nitrogen by contacting said nitrogen oxides with a nitrogen-containing reductant, wherein the active dispersed cations are selected from 1 or more elements of the alkali metal group of the Periodic Table of Elements.

A method of the invention for the conversion of the oxides of nitrogen to nitrogen by contacting said nitrogen oxides with a nitrogen-containing reductant, wherein the active dispersed cations are selected from the group consisting of Cu, Fe, Nb, Ta, W and mixtures thereof.

A method of the invention for the conversion of the oxides of nitrogen to nitrogen by contacting said nitrogen oxides with a nitrogen-containing reductant, wherein said conversion takes place with reduction of oxides of nitrogen via reaction with a nitrogen-containing reducing agent at a temperature of at least 100° C.

A method of the invention for the conversion of the oxides of nitrogen to nitrogen by contacting said nitrogen oxides with a nitrogen-containing reductant, wherein the temperature is from about 150° C. to about 700° C.

A method of the invention for the conversion of the oxides of nitrogen to nitrogen by contacting said nitrogen oxides with a nitrogen-containing reductant, wherein the conversion of oxides of nitrogen to nitrogen is performed under conditions of an excess of oxygen.

A method of the invention for the conversion of the oxides of nitrogen to nitrogen by contacting said nitrogen oxides with a nitrogen-containing reductant, wherein a source of nitrogen-containing reductant is introduced to give an effective $NH_3$:NOx ratio ($\alpha$ ratio) at catalyst inlet of 0.5 to 2.

A method of the invention for the conversion of the oxides of nitrogen to nitrogen by contacting said nitrogen oxides with a nitrogen-containing reductant, wherein the $NO:NO_2$ ratio recorded at the inlet of the catalyst is from 1:0 to 1:3 by volume.

A method of the invention for the conversion of the oxides of nitrogen to nitrogen by contacting said nitrogen oxides with a nitrogen-containing reductant, wherein an oxidation catalyst is employed prior to the base metal oxide (SCR) catalyst to enable generation of $NO_2$-enriched exhaust gas.

A method of the invention for the conversion of the oxides of nitrogen to nitrogen by contacting said nitrogen oxides with a nitrogen-containing reductant, wherein the nitrogen-containing reductant is an organo-nitrogen compound known to produce $NH_3$ under conditions of hydrolysis or decomposition, selected from group consisting of urea $((NH_2)_2CO)$, ammonium carbonate, ammonium carbamate, ammonium hydrogen carbonate, ammonium formate and mixtures thereof.

A method of the invention for the conversion of the oxides of nitrogen to nitrogen by contacting said nitrogen oxides with a nitrogen-containing reductant, wherein the nitrogen oxides are in a nitrogen oxide-containing gas stream which is an effluent stream generated from a combustion process.

A method of the invention for the conversion of the oxides of nitrogen to nitrogen by contacting said nitrogen oxides with a nitrogen-containing reductant, wherein the combustion process comprises the combustion of fuel in an internal combustion engine.

A method of the invention for the conversion of the oxides of nitrogen to nitrogen by contacting said nitrogen oxides with a nitrogen-containing reductant, wherein the internal combustion engine is a vehicular internal combustion engine operating under fuel lean/oxygen rich conditions.

A method for making a catalytically active cation doped lattice as a catalyst comprising incorporating a phase pure crystal lattice structure with catalytically active cations without the formation of additional phases, such that phase analysis by conventional x-ray diffraction method reveals a substantially phase pure material (>95%), with bulk metal oxide dopant phase being recorded at <5% and dopant metal oxide particle size, as determined by line-broadening/Scherrer equation determination, is about 30 Å to about 100 Å.

A method of the invention for making a catalytically active cation doped lattice as a catalyst, wherein the catalytically active cation doped into the lattice structure is from about 0.01 wt % to 15 wt %, based upon the total mass of the catalyst.

A method of the invention for making a catalytically active cation doped lattice as a catalyst, wherein the catalytically active cation doped into the lattice structure is from about 0.1 wt % to 10 wt %, based upon the total mass of the catalyst.

A method of the invention for making a catalytically active cation doped lattice as a catalyst, wherein the catalytically active cation doped into the lattice structure is from about 1 wt % to 7.5%, based upon the total mass of the catalyst A method of the invention for making a catalytically active cation doped lattice as a catalyst, wherein the catalytically active cation doped lattice material is produced by a direct synthesis via co-precipitation.

A method of the invention for making a catalytically active cation doped lattice as a catalyst, wherein the catalytically active cation doped lattice material is produced by contacting the lattice material with a precursor solution of dissolved cations under conditions of high pH and low hydronium ion ($H_3O^+$) content, followed by drying and calcination to remove any solvent and to convert the cations into highly dispersed metallic or metal oxide ensembles or clusters.

A method of the invention for making a catalytically active cation doped lattice as a catalyst, wherein the catalytically active cation doped lattice material is produced by contacting the lattice material with a precursor solution of dissolved cations and an organic depositing reagent which is an aqueous soluble organic capable of forming a hydrogen-bonded, gel-like matrix when the water or other solvent is removed by heating; said gel-like matrix supporting ions of precursor cations to maintain high homogeneity and high dispersion within and on the lattice.

A method of the invention for making a catalytically active cation doped lattice as a catalyst, wherein the catalytically active cation doped lattice material is produced by contacting the lattice material with a precursor solution of dissolved cations under conditions of low pH and high hydronium ion ($H_3O^+$) content, followed by drying and calcination to remove any solvent and to convert the cations into highly dispersed metallic or metal oxide ensembles or clusters.

A method of the invention for making a catalytically active cation doped lattice as a catalyst, wherein the catalyst additionally contains an inert oxide binder selected from the group consisting of alumina, titania, non-zeolitic silica-alumina, silica, zirconia, composites and mixtures thereof.

A method of the invention for making a catalytically active cation doped lattice as a catalyst, wherein the catalyst additionally contains a minor concentration co-catalyst based upon a zeolite/zeotype or metal exchanged zeolite/zeotype.

A method of the invention for making a catalytically active cation doped lattice as a catalyst, wherein the optional zeolite/zeotype or metal exchanged zeolite/zeotype is from about 1 wt % to about 35 wt % of total catalyst mass.

A method of the invention for making a catalytically active cation doped lattice as a catalyst, wherein the optional zeolite/zeotype or metal exchanged zeolite/zeotype is selected from the group consisting of ZSM5, zeolite β, chabazite, SAPO-34, zeolites characterized by a structure containing an 8-ring pore opening structure and mixtures thereof.

A method of the invention for making a catalytically active cation doped lattice as a catalyst, wherein the metal employed in the metal exchanged zeolite/zeotype is selected from the group consisting of copper, iron and mixtures thereof.

A method of the invention for making a catalytically active cation doped lattice as a catalyst, wherein exchanged copper and iron or mixture thereof is present at 0.5 to about 7.5 wt % based on the mass of zeolite/zeotype.

A method of the invention for making a catalytically active cation doped lattice as a catalyst, wherein the catalyst and a binder are coated on a flow through ceramic monolith, metal substrate or foam.

A method of the invention for making a catalytically active cation doped lattice as a catalyst, wherein the catalyst and a binder are coated on a wall-flow ceramic filter substrate.

A method of the invention for making a catalytically active cation doped lattice as a catalyst, wherein the catalyst is extruded with appropriate binder and fibres to yield a fully formed monolith.

A heterogeneous base metal catalyst, with optional low zeolite/zeotype content with said catalyst consisting of:
  (a) a phase pure crystal lattice structure, wherein the lattice structure is selected from one or a mixture of oxides based upon zirconium, cerium-zirconium composite, cerium-zirconium-yttrium composite, cerium-zirconium-rare earth composite or cerium-zirconium-yttrium-rare earth composite, and
  (b) catalytically active cations dispersed with said lattice structure, wherein the catalytically dispersed cations are selected from the group consisting of the transition metal series, alkaline earth metal group, alkali metal group of the Periodic Table of Elements and mixtures thereof.

A heterogeneous base metal catalyst of the invention, with optional low zeolite/zeotype content with said catalyst, wherein said cations are selected from the group consisting of Cu, Fe, Nb, Ta, W and mixtures thereof.

We claim:

1. A method for the conversion of the oxides of nitrogen to nitrogen by contacting said nitrogen oxides with a nitrogen-containing reductant in the presence of a base metal oxide catalyst comprising:
  (a) >95% phase pure crystal lattice structure, as determined by conventional powder X-Ray Diffraction (XRD) method; and
  (b) catalytically active cations dispersed within said lattice structure, without the formation of additional phases, wherein the phase pure lattice structure is derived from
    (i) oxides of a cerium-zirconium solid solution and the catalytically active dispersed cations consist of Nb, or
    (ii) oxides of a cerium-zirconium-yttrium solid solution.

2. A method according to claim 1, wherein when derived from oxides of a cerium-zirconium-yttrium solid solution the active dispersed cations are selected from 1 or more elements of the group consisting of transition metal series of the Periodic Table of Elements, alkaline earth metal group of the Periodic Table of Elements and alkali metal group of the Periodic Table of Elements.

3. A method according to claim 1, wherein when derived from oxides of a cerium-zirconium-yttrium solid solution the active dispersed cations are selected from the group consisting of Cu, Fe, Nb, Ta, W and mixtures thereof.

4. A method according to claim 1, wherein the temperature is about 150° C. to about 700° C.

5. A method according to claim 1, wherein the conversion of oxides of nitrogen to nitrogen is performed under excess of oxygen.

6. A method according to claim 1, wherein a source of nitrogen-containing reductant is introduced to give an effective $NH_3$:NOx ratio (α ratio) at a catalyst inlet of 0.5 to 2.

7. A method according to claim 1, wherein the NO:$NO_2$ ratio recorded at the inlet of the catalyst is from 1:0 to 1:3 by volume.

8. A method according to claim 7, wherein an oxidation catalyst is employed prior to the base metal oxide (SCR) catalyst to enable generation of $NO_2$-enriched exhaust gas.

9. A method according to claim 1, wherein the catalytically active cation doped lattice as a catalyst comprises incorporation of a phase pure crystal lattice structure with catalytically active cations without the formation of additional phases, such that phase analysis by conventional x-ray diffraction (XRD) method reveals a substantially phase pure material (>95%), with bulk metal oxide dopant phase being recorded at <5% and dopant metal oxide particle size, as determined by line-broadening/Scherrer equation determination, is about 30 Å to about 100 Å.

10. A method according to claim 1, wherein the catalytically active cation doped into the lattice structure is about 1 wt% to 7.5 wt%, based upon the total mass of the catalyst.

11. A method according to claim 1, wherein the catalytically active cation doped lattice material is produced by a direct synthesis via coprecipitation.

12. A method according to claim 1, wherein the catalyst additionally contains a co-catalyst based upon a zeolite/zeotype or metal exchanged zeolite/zeotype.

13. A method according to claim 12, wherein the zeolite/zeotype or metal exchanged zeolite/zeotype is about 1 wt% to about 35 wt% of total catalyst mass.

14. A method according to claim 12, wherein the zeolite/zeotype or metal exchanged zeolite/zeotype is selected from the group consisting of ZSM5, zeolite β, chabazite, SAPO-34, zeolites characterized by a structure containing an 8-ring pore opening structure, and mixtures thereof.

15. A method according to claim 12, wherein the metal employed in the metal exchanged zeolite/zeotype is selected from the group consisting of copper, iron, and mixtures thereof.

* * * * *